(12) United States Patent
Yamada

(10) Patent No.: US 9,357,460 B2
(45) Date of Patent: May 31, 2016

(54) SYSTEMS AND METHODS FOR ESTABLISHING MULTIPLE RADIO CONNECTIONS

(71) Applicant: Sharp Laboratories of America, Inc., Camas, WA (US)

(72) Inventor: Shohei Yamada, Camas, WA (US)

(73) Assignee: Sharp Kabushiki Kaisha, Osaka (JP)

( * ) Notice: Subject to any disclaimer, the term of this patent is extended or adjusted under 35 U.S.C. 154(b) by 121 days.

(21) Appl. No.: 13/849,423

(22) Filed: Mar. 22, 2013

(65) Prior Publication Data

US 2014/0286305 A1 Sep. 25, 2014

(51) Int. Cl.
| | |
|---|---|
| *H04W 74/08* | (2009.01) |
| *H04W 36/16* | (2009.01) |
| *H04W 74/02* | (2009.01) |
| *H04W 36/00* | (2009.01) |
| *H04W 76/02* | (2009.01) |

(52) U.S. Cl.
CPC ............ *H04W 36/165* (2013.01); *H04W 74/02* (2013.01); *H04W 36/0077* (2013.01); *H04W 76/025* (2013.01)

(58) Field of Classification Search
CPC .......... H04W 74/0833; H04W 36/165; H04W 74/02; H04W 76/025; H04W 36/0077
See application file for complete search history.

(56) References Cited

U.S. PATENT DOCUMENTS

| | | | | |
|---|---|---|---|---|
| 2012/0300752 | A1* | 11/2012 | Kwon et al. | 370/336 |
| 2013/0114576 | A1* | 5/2013 | Kwon et al. | 370/336 |
| 2013/0188582 | A1* | 7/2013 | Dinan | 370/329 |
| 2013/0188620 | A1* | 7/2013 | Dinan | 370/336 |
| 2013/0201960 | A1* | 8/2013 | Kim et al. | 370/331 |
| 2013/0258959 | A1* | 10/2013 | Dinan | 370/329 |
| 2013/0259008 | A1* | 10/2013 | Dinan | 370/336 |
| 2013/0260735 | A1* | 10/2013 | Dinan | 455/418 |
| 2014/0192771 | A1* | 7/2014 | Jung et al. | 370/331 |

FOREIGN PATENT DOCUMENTS

| | | |
|---|---|---|
| WO | 2012/042376 | 4/2012 |
| WO | 2012/121757 | 9/2012 |

OTHER PUBLICATIONS

3GPP TS 36.300 V8.5.0, Evolved Universal Terrestrial Radio Access (E-UTRA) and Evolved Universal Terrestrial Radio Access Network (E-UTRAN), (Release 8), May 2008.
China Mobile (Rapporteur), "Draft TR 36.932 Ver. 1.0.0 Scenarios and Requirements for Small Cell Enhancements for E-UTRA and E-UTRAN (Release 12) for Information and Approval," 3GPP TSG RAN Meeting #58, RP-121468, Dec. 2012.
NTT Docomo, Inc, New Study Item Description: Small Cell enhancements for E-UTRA and E-UTRAN Higher-layer Aspects, 3GPP TSG-RAN Meeting #58, RP-122033, Dec. 2012.
NTT Docomo, Inc, "Necessity of C-Plane Architecture Enhancements for Dual Connectivity," 3GPP TSG-RAN2 Meeting #81, R2-130488, Feb. 2013.
Qualcomm Incorporated, NTT Docomo, Inc, "Metrics and Scenarios for Small Cell Study of RRM Structure and Mobility Enhancements," 3GPP TSG-RAN2 Meeting #81, R2-130597, Feb. 2013.

* cited by examiner

*Primary Examiner* — Brian D Nguyen
(74) *Attorney, Agent, or Firm* — Austin Rapp & Hardman

(57) ABSTRACT

A method for establishing multiple radio connections by a user equipment (UE) is described. The method includes establishing a primary radio connection between the UE and a first point on an Evolved Universal Terrestrial Radio Access Network (E-UTRAN). The method also includes receiving a connection control message for a second radio connection with a second point on the E-UTRAN. The method also includes performing a random access procedure for the secondary radio connection in response to receiving the connection control message.

8 Claims, 23 Drawing Sheets

SYSTEMS AND METHODS FOR ESTABLISHING MULTIPLE RADIO CONNECTIONS

TECHNICAL FIELD

The present disclosure relates generally to communication systems. More specifically, the present disclosure relates to systems and methods for establishing multiple radio connections.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and efficiency have been sought. However, improving communication capacity, speed, flexibility and efficiency may present certain problems.

For example, wireless communication devices may communicate with one or more devices using a communication structure. However, the communication structure used may offer limited flexibility and efficiency. As illustrated by this discussion, systems and methods that improve communication flexibility and efficiency may be beneficial.

DETAILED DESCRIPTION

Figure 1:
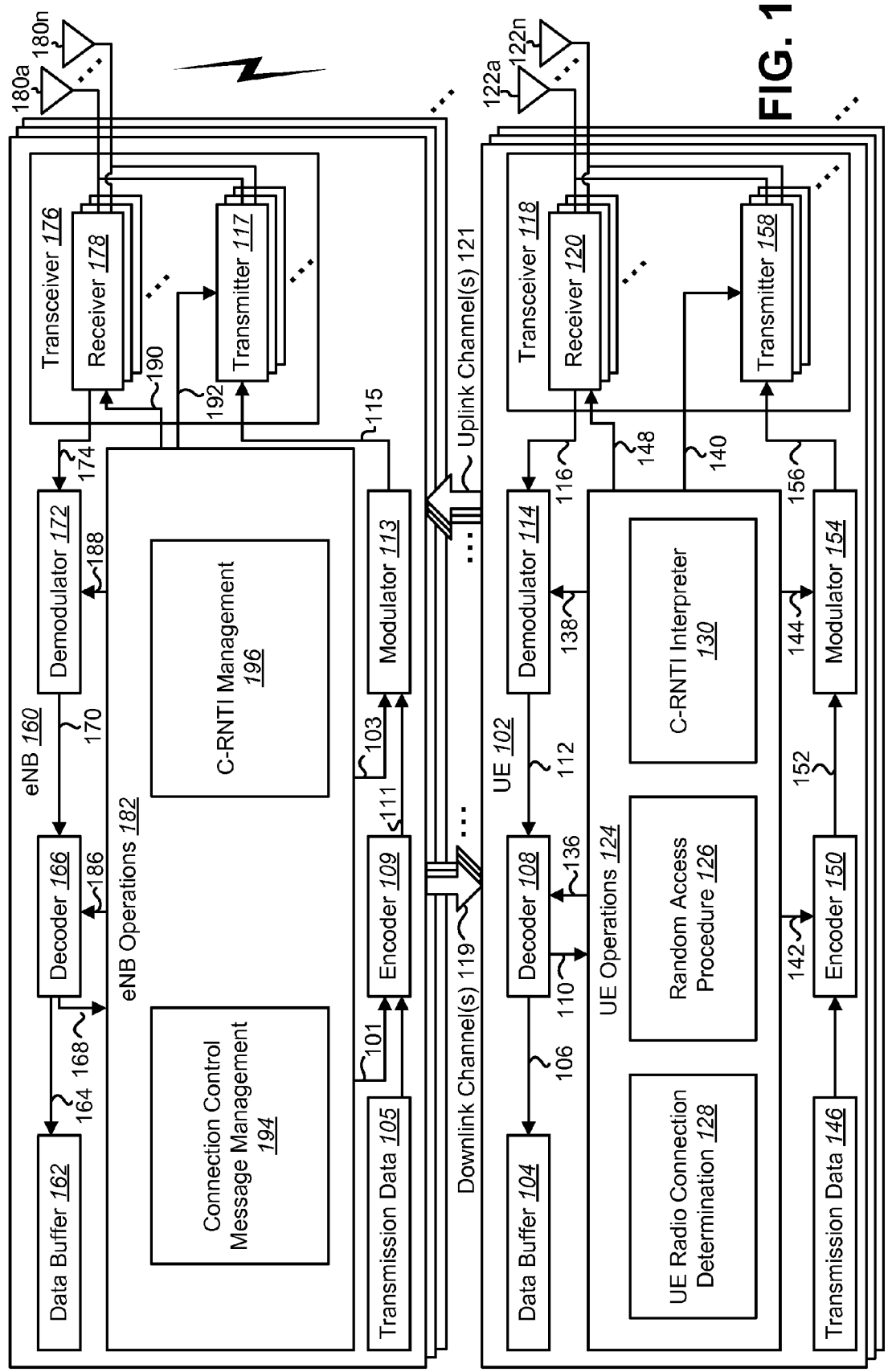
FIG. 1 is a block diagram illustrating one configuration of one or more evolved Node Bs (eNBs) and one or more user equipments (UEs) in which systems and methods for establishing multiple radio connections may be implemented.

A method for establishing multiple radio connections by a UE is described. The method includes establishing a primary radio connection between the UE and a first point on an Evolved Universal Terrestrial Radio Access Network (E-UTRAN). The method also includes receiving a connection control message for a secondary radio connection with a second point on the E-UTRAN. The method further includes performing a random access procedure for the secondary radio connection in response to receiving the connection control message.

Performing a random access procedure may include performing a non-contention-based random access procedure for the secondary radio connection in a case that a dedicated random access channel (RACH) preamble is indicated in the connection control message. Performing a random access procedure may also include performing a contention-based random access procedure for the secondary radio connection in a case that a dedicated RACH preamble is not indicated.

The connection control message may direct the UE to perform at least one of an addition of connection and a handover in a secondary radio connection. The connection control message may include at least one of a cell radio network temporary identifier (C-RNTI) for the second radio connection, a physical cell identifier for a target cell, a security algorithm identifier and a dedicated RACH preamble identity.

The method may also include sending a connection reconfiguration complete message to confirm at least one of an addition of connection and a handover in a secondary radio connection. The first point may be at least one of a primary evolved Node B (PeNB) and a secondary eNB (SeNB).

A method for establishing multiple radio connections by an eNB is described. The method includes sending a connection control message for a secondary radio connection in a radio resource control (RRC) connection reconfiguration message.

The connection control message may indicate whether a dedicated RACH preamble is included in the connection control message. The method may include obtaining a connection control message.

The eNB may be a PeNB. Obtaining a connection control message may include receiving a connection control message from a SeNB. The connection control message may be sent to a UE. The method may include sending a connection request message that may be based on a measurement report and radio resource management information. The connection control message may be based on the connection request message.

The eNB may be a SeNB. Obtaining a connection control message may include generating a connection control message. The connection control message may be sent to a PeNB. The method may include receiving a connection request message that may be based on a measurement report and radio resource management information. The connection control message may be based on the connection request message.

The connection control message may direct a UE to perform at least one of an addition of connection and a handover in a secondary radio connection. The connection control message may include at least one of a C-RNTI for the second radio connection, a physical cell identifier for a target cell, a security algorithm identifier and a dedicated RACH preamble identity.

A UE for establishing multiple radio connections is described. The UE includes a processor and memory in electronic communication with the processor. Instructions stored in the memory are executable to establish a primary radio connection between the UE and a first point on an E-UTRAN. The instructions are also executable to receive a connection control message for a secondary radio connection with a second point on the E-UTRAN. The instructions are also executable to perform a random access procedure for the secondary radio connection in response to receiving the connection control message.

An eNB for establishing multiple radio connections is described. The eNB includes a processor and memory in electronic communication with the processor. Instructions stored in the memory are executable to send a connection control message for a secondary radio connection in a RRC connection reconfiguration message.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and E-UTRAN.

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., a public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device."

In 3GPP specifications, a base station is typically referred to as a Node B, an eNB, a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, one example of a "base station" is an access point. An access point may be an electronic device that provides access to a network (e.g., Local Area Network (LAN), the Internet, etc.) for wireless communication devices. The term "communication device" may be used to denote both a wireless communication device and/or a base station.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. "Configured cells" are those cells of which the UE is aware and is allowed by an eNB to transmit or receive information. "Configured cell(s)" may be serving cell(s). The UE may receive system information and perform the required measurements on all configured cells. "Configured cell(s)" may consist of a primary cell and no, one, or more secondary cell(s). "Activated cells" are those configured cells on which the UE is transmitting and receiving. That is, activated cells are those cells for which the UE monitors the PDCCH and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

As used herein, the term "connection" may refer to a communication link between a UE and an E-UTRAN. As used herein, the terms "radio connection," "connection," "radio interface" and "interface" may be used interchangeably.

The systems and methods disclosed herein describe devices for establishing multiple radio connections. This may be done in the context of an E-UTRAN. For example, the systems and methods disclosed herein may establish multiple radio connections between a UE and two or more eNBs on an E-UTRAN. In one configuration, the two or more eNBs may have different schedulers.

The systems and methods described herein may enhance carrier aggregation. In carrier aggregation, two or more component carriers may be aggregated in order to support wider transmission bandwidths (e.g., up to 100 megahertz (MHz)). In one example, carrier aggregation may be used to increase the effective bandwidth available to a UE. In traditional carrier aggregation, a single eNB may be assumed to provide multiple serving cells for a UE. Even in scenarios where two or more cells may be aggregated (e.g., a macro cell aggregated with remote radio head (RRH) cells), the cells may be controlled (e.g., scheduled) by a single eNB. However, in a small cell deployment scenario, each node (e.g., eNB, RRH, etc.) may have its own independent scheduler. To utilize the radio resources of both nodes efficiently, a UE may connect to two or more nodes that have different schedulers.

In one configuration, for a UE to connect to two nodes (e.g., eNBs) that have different schedulers, multi-connectivity between the UE and the E-UTRAN may be utilized. For example, in addition to Rel-11 operation, a UE operating according to the Rel-12 standard may be configured with multi-connectivity (which may be referred to as dual connectivity, inter-eNB carrier aggregation, multi-flow, multi-cell cluster, multi-Uu, etc.). The UE may connect to the E-UTRAN with multiple Uu interfaces, if configured to do so. For instance, the UE may be configured to establish one or more additional radio interfaces (e.g., radio connections) by using one radio interface (e.g., radio connection). Hereafter, one node may be called a primary eNB (PeNB) and another node may be called a secondary eNB (SeNB).

In a multi-connectivity scenario, radio resource management functionality may be located in each node of the E-UTRAN. Accordingly, one node may have some freedom on how to configure the UE. For example, resources (e.g., scheduling, random access resource and C-RNTIs) for a node may need to be able to be managed by the node. Establishing multiple radio connections, as described in the systems and methods disclosed herein, may utilize radio resources of both nodes efficiently.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one configuration of one or more evolved Node Bs (eNBs) 160 and one or more user equipments (UEs) 102 in which systems and methods for establishing multiple connections may be implemented. The one or more UEs 102 may communicate with one or more eNBs 160 using one or more antennas 122a-n. For example, a UE 102 may transmit electromagnetic signals to the eNB 160 and may receive electromagnetic signals from the eNB 160 using the one or more antennas 122a-n. The eNB 160 may communicate with the UE 102 using one or more antennas 180a-n. It should be noted that one or more of the UEs described herein may be implemented in a single device in some configurations. Additionally or alternatively, one or more of the eNBs 160 described herein may be implemented in a single device in some configurations. In the context of FIG. 1, for instance, a single device may include one or more UEs 102 in accordance with the systems and methods described herein. Additionally or alternatively, one or more eNBs 160 in accordance with the systems and methods described herein may be implemented as a single device or multiple devices.

The UE 102 and the eNB 160 may use one or more channels 119, 121 to communicate with each other. For example, a UE 102 may transmit information or data to the eNB 160 using one or more uplink channels 121. Examples of uplink channels 121 include a physical uplink control channel (PUCCH) and a physical uplink shared channel (PUSCH), etc. The one or more eNBs 160 may also transmit information or data to the one or more UEs 102 using one or more downlink channels 119, for instance. Examples of downlink channels 119 include a PDCCH, a PDSCH, etc. Other kinds of channels may be used.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the eNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the eNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce one or more decoded signals 106, 110. For example, a first UE-decoded signal 106 may comprise received payload data, which may be stored in a data buffer 104. A second UE-decoded signal 110 may comprise overhead data and/or control data. For example, the second UE-decoded signal 110 may provide data that may be used by the UE operations module 124 to perform one or more operations.

As used herein, the term "module" may mean that a particular element or component may be implemented in hardware, software or a combination of hardware and software. However, it should be noted that any element denoted as a "module" herein may alternatively be implemented in hardware. For example, the eNB operations module 182 may be implemented in hardware, software or a combination of both.

In general, the UE operations module 124 may enable the UE 102 to communicate with the one or more eNBs 160. The UE operations module 124 may include one or more of a UE radio communication determination module 128, a random access procedure module 126 and a C-RNTI interpreter 130.

The UE radio connection determination module 128 may establish a primary radio connection between the UE 102 and a first point on an E-UTRAN. For example, the first point may include a first eNB 160 belonging to the E-UTRAN. In one configuration, the first eNB 160 may be a PeNB. For example, when a UE 102 is adding a connection, the first point (e.g., the first eNB 160) may be a PeNB. The UE radio connection determination module 128 may connect to the first point (e.g., the first eNB 160) with a Uu interface. The Uu interface may also be referred to as a primary Uu interface. The Uu interface may be a radio connection between the UE 102 and the PeNB.

The UE 102 may be configured to establish a second radio connection between the UE 102 and a second point on the E-UTRAN. For example, the second point may include a second eNB 160 belonging to the E-UTRAN. In one configuration, the second eNB 160 may be a SeNB, when the UE 102 is adding a connection, for example. In one configuration, the first point (e.g., the first eNB 160) and the second point (e.g., the second eNB 160) may have different schedulers. The UE radio connection determination module 128 may connect to the second eNB 160 with a Uux interface. The Uux interface may also be referred to as a secondary Uu interface.

In some configurations, certain procedures may be performed during a handover procedure between cell(s) in a source SeNB and cell(s) in a target SeNB. For example, the UE 102 may first connect to the cell(s) in the source SeNB as a second point. After successfully accessing (via a random access, for example) the cell(s) in the target SeNB, connection with the target SeNB may be complete. The UE 102 may connect to the cell(s) in the target SeNB as the second point. For example, after receiving a signal from the target SeNB and transmitting a random access preamble, the UE 102 may complete a connection to the cell(s) in the target SeNB as the second point. In some implementations, this may be a handover in a secondary radio connection. In these implementations, a point may not be added, but rather replaced.

There may be several types of handover procedures for a secondary radio connection. One example is an intra-cell handover, where a cell in a SeNB may be updated by a handover procedure to the same cell. Another example is an intra-SeNB handover, where a cell in a SeNB may switch to another cell in the SeNB. Yet another example is an inter-SeNB handover, where a cell in a SeNB may switch to another cell in another SeNB. Accordingly, the target SeNB may or may not be the same with the source SeNB.

The UE 102 may not be required to be aware of the PeNB and the SeNB, as long as the UE 102 is aware of the multiple Uu interfaces with the E-UTRAN. In one configuration, the UE 102 may see an eNB 160 as a point on the E-UTRAN. In another configuration, the UE 102 may see the multiple Uu interfaces with the E-UTRAN as connections with multiple points on the E-UTRAN. In another configuration, the E-UTRAN may provide multiple Uu interfaces with the same or different eNBs 160. For instance, the PeNB and the SeNB may be the same eNB 160. The multiple Uu interfaces (e.g., multi-connectivity) may be achieved by a single eNB 160. In other words, in one configuration, the systems and methods described herein may be achieved by a single eNB 160 or a single scheduler. The UE 102 may be able to connect more than one Uux interface (e.g., Uu1, Uu2, Uu3, etc.). Each Uu interface may be used to perform carrier aggregation. Accordingly, the UE 102 may be configured with more than one set of serving cells in a carrier aggregation scenario.

It should be noted that while multiple Uu interfaces are described, the systems and methods described herein may be realized by a single Uu interface or a single radio connection depending on the definition of interface. For example, a radio interface may be defined as an interface between the UE 102 and the E-UTRAN. In this definition, the interface may not be an interface between the UE 102 and the eNB 160. For example, one radio interface may be defined as an interface between the UE 102 and the E-UTRAN with multi-connectivity. Accordingly, the Uu interface and the Uux interface discussed above may be considered as different characteristics of cells. For instance, the Uu interface may be a first set of cell(s) and the Uux interface may be a second set of cell(s). Also, the first radio interface may be rephrased as a first set of cell(s) and the second radio interface may be rephrased as a second set of cell(s).

The random access procedure module 126 may perform a random access procedure for a radio connection. For example, the random access procedure module 126 may perform a random access procedure for a secondary radio connection. According to some configurations, multiple random access procedures may be triggered. In some implementations, the random access procedure for a radio connection may be a random access procedure for another radio connection in parallel or concurrently. The random access procedure may be performed for a cell of a radio connection.

It should be noted that even in a single connectivity configuration, multiple random access procedures may be triggered. However, there may be only one random access procedure ongoing at any point in time in a single connectivity configuration. If the UE 102 receives a request for a new random access procedure in a radio connection while another random access procedure is already ongoing in the radio connection, it may be up to the UE 102 to determine whether to continue with the ongoing random access procedure or start with the new random access procedure.

An example of a random access procedure may be accessing a target cell via a random access channel (RACH). The random access procedure module 126 may perform different types of random access procedures. For example, the random access procedure module 126 may perform a non-contention-based random access procedure. Performing a non-contention-based random access procedure may include utilizing a dedicated random access preamble via a random access channel to access a target cell. In another example, the UE 102 may perform a contention-based random access procedure. An example of a contention-based random access procedure may include accessing a target cell via a random access channel using a randomly selected preamble. More detail concerning non-contention-based random access procedures and contention-based random access procedures is given in connection with at least one of FIGS. 4 and 5.

In some implementations, whether the UE 102 performs a contention-based random access procedure or a non-contention-based random access procedure for a secondary radio connection may be based on a received message. For example, the UE 102 may receive a RRC connection reconfiguration message that may include a connection control message. The connection control message may indicate whether a dedicated RACH preamble identity (e.g., a random access preamble identity) is included in the connection control message (e.g., whether a dedicated RACH preamble is indicated in the connection control message). If the connection control message includes a dedicated RACH preamble identity, the UE 102 may perform a non-contention-based random access procedure. By comparison, if the connection control message does not include a dedicated RACH preamble identity, the UE 102 may perform a contention-based random access procedure.

An example of performing a random access procedure is given as follows. In response to an RRC connection reconfiguration message including the connection control message, the UE 102 may perform a random access procedure. The RRC connection reconfiguration message (e.g., RRCConnectionReconfiguration) may carry a handover command (e.g., MobilityControlInfo (mobility control information)). The RRC connection reconfiguration message (e.g., RRCConnectionReconfiguration) may also carry a connection control message (e.g., ConnectionControlInfo (connection control information)). According to Rel-11 and before, the RRC connection reconfiguration message may have been used for many purposes, for example, physical layer parameters, media access control (MAC) layer control parameters, and one or more UE 102 configuration parameters, etc. When implemented in accordance with known specifications (e.g., Rel-11 and before), the RRC connection reconfiguration message may be a legacy message. For example, when the RRC connection reconfiguration message includes a handover command, a RACH may be triggered for a single connection. However, it should be noted that the systems and methods described herein introduce a connection control message in addition to the behaviors of Rel-11 and before.

In some implementations, if the RRC connection reconfiguration message includes a handover command (e.g., MobilityControlInfo), the UE 102 may perform a handover procedure. In the handover command, a dedicated RACH preamble may be included. In response to the RRC connection reconfiguration message (that includes the handover command), the UE 102 may perform a random access procedure. In some implementations, the connection control message may be different from a handover command. For example, a handover command may be used for a handover for a single radio connection. On the other hand, a connection control message may be used to add a secondary radio connection and/or a handover in the secondary radio connection.

In carrier aggregation, an addition of a secondary cell may be signaled to the UE 102 by the RRC connection reconfiguration message. However, since the RRC connection reconfiguration message may not include a handover command, the UE 102 may not trigger a random access procedure in response to the RRC connection reconfiguration message. If necessary, a random access order may be signaled to the UE 102 to achieve an uplink time alignment in the secondary cell. In case of the addition of the secondary radio connection, it may be better to trigger a random access because a cell that is newly added may be managed by a different scheduler and is likely unsynchronized with a cell that is already configured for the UE 102.

The C-RNTI interpreter 130 may decode a PDCCH or an EPDCCH. Decoding a PDCCH (or an EPDCCH) may include interpreting the PDCCH (or the EPDCCH). An example is given as follows. The UE 102 may receive a PDCCH that carries downlink control information (DCI). DCI in each PDCCH (or each EPDCCH) may use a DCI format that defines the fields of the DCI. In some implementations, a Radio Network Temporary Identifier (RNTI) (e.g., a C-RNTI) may be included with the DCI. A RNTI (e.g., a C-RNTI) may be used to identify the UE 102 and identify usage. A RNTI may also be used in scheduling resources for a radio connection. For a UE configured for single connectivity with an E-UTRAN, it should be noted that the UE may use the same C-RNTI for all serving cells. In Rel-11 and before, a C-RNTI may be allocated to a UE 102. A RNTI (a C-RNTI, for example) may have several usages. Table (1) presents various RNTI values. Table (2) presents various RNTI usages and associated transport channels and logical channels.

TABLE (1)

| Value (hexa-decimal) | RNTI |
|---|---|
| 0000 | N/A |
| 0001-003C | Random Access-RNTI (RA-RNTI), C-RNTI, Semi-Persistent Scheduling C-RNTI, Temporary C-RNTI, Transmit Power Control-Physical Uplink Control Channel-RNTI (TPC-PUCCH-RNTI) and Transmit Power Control-Physical Uplink Shared Channel-RNTI (TPC-PUSCH-RNTI) |
| 003D-FFF3 | C-RNTI, Semi-Persistent Scheduling C-RNTI, Temporary C-RNTI, TPC-PUCCH-RNTI and TPC-PUSCH-RNTI |
| FFF4-FFFC | Reserved for future use |
| FFFD | Multimedia Broadcast Multicast Service RNTI (M-RNTI) |
| FFFE | Paging RNTI (P-RNTI) |
| FFFF | System Information RNTI (SI-RNTI) |

TABLE (2)

| RNTI | Usage | Transport Channel | Logical Channel |
|---|---|---|---|
| P-RNTI | Paging and System Information change notification | Paging Channel (PCH) | Paging Control Channel (PCCH) |
| SI-RNTI | Broadcast of System Information | Downlink Shared Channel (DL-SCH) | Broadcast Control Channel (BCCH) |
| M-RNTI | Multicast Control Channel (MCCH) Information change notification | N/A | N/A |
| RA-RNTI | Random Access Response | DL-SCH | N/A |
| Temporary C-RNTI | Contention Resolution (when no valid C-RNTI is available) | DL-SCH | Common Control Channel (CCCH) |
| Temporary C-RNTI | Msg3 transmission | Uplink Shared Channel (UL-SCH) | CCCH, (Dedicated Control Channel) DCCH, (Dedicated Traffic Channel) DTCH |
| C-RNTI | Dynamically scheduled unicast transmission | UL-SCH | DCCH, DTCH |
| C-RNTI | Dynamically scheduled unicast transmission | DL-SCH | CCCH, DCCH, DTCH |
| C-RNTI | Triggering of PDCCH ordered random access | N/A | N/A |
| Semi-Persistent Scheduling C-RNTI | Semi-Persistently scheduled unicast transmission (activation, reactivation and retransmission) | DL-SCH, UL-SCH | DCCH, DTCH |
| Semi-Persistent Scheduling C-RNTI | Semi-Persistently scheduled unicast transmission (deactivation) | N/A | N/A |
| TPC-PUCCH-RNTI | Physical layer Uplink power control | N/A | N/A |
| TPC-PUSCH-RNTI | Physical layer Uplink power control | N/A | N/A |

An example of a C-RNTI included in a PDCCH is given as follows. A cyclic redundancy check (CRC) may be included in the DCI. Error detection may be provided on DCI transmissions through a CRC. In some implementations, the C-RNTI may be implicitly encoded in the CRC. The number of parity bits of the CRC may be 16. The entire payload may be used to calculate the CRC parity bits. In some configurations, the CRC parity bits may be scrambled with a corresponding RNTI (e.g., a C-RNTI). In other words, the CRC parity bits may be "XORed" with a RNTI. In this example, the C-RNTI interpreter 130 may decode (and interpret) the PDCCH. Interpreting the PDCCH may include separating the CRC parity bits from the C-RNTI. In some implementations, a physical (PHY) layer of the UE 102 may be configured by a higher layer (e.g., a MAC sublayer or a radio resource control (RRC) sublayer) of the UE 102 to decode the PDCCH (or the EPDCCH) with a CRC scrambled by the C-RNTI. The DCI may also transport downlink or uplink scheduling information, request aperiodic channel quality information (CQI) reports, send notifications of MCCH changes and send uplink power control commands for a cell and a RNTI.

In some implementations, the C-RNTI interpreter 130 may decode multiple PDCCHs. For example, in Rel-11 and before, a UE may not have been configured to decode (and interpret) a first PDCCH (or a first EPDCCH) with a first CRC scrambled by a first C-RNTI and to decode (and interpret) a second PDCCH or (a second EPDCCH) with a second CRC scrambled by a second C-RNTI. However, according to the systems and methods disclosed herein, in addition to decoding (and interpreting) a PDCCH with a CRC scrambled by a first C-RNTI, the UE 102 may be configured to decode (and interpret) a PDCCH with a CRC scrambled by a second C-RNTI.

An example is given as follows. In Rel-11 and before, a UE may have been configured to monitor or decode PDCCHs in a common search space of a primary cell (PCell) and a UE 102 specific search space of each serving cell (e.g., PCell and secondary cell(s) (SCell)). A search space may be defined as a set of candidate PDCCHs (or EPDCCHs) to be decoded. The UE may also be configured with kinds of DCI formats that should be monitored or decoded in the search spaces. The UE may be further configured with kinds of RNTIs (corresponding to a DCI format) that should be monitored or decoded in the DCI with a DCI format in each PDCCH in the search spaces.

In some cases, the UE 102 may be configured to monitor or decode a PDCCH with a CRC scrambled by a C-RNTI, to monitor or decode a PDCCH with a CRC scrambled by a Temporary C-RNTI, to monitor or decode a PDCCH with a CRC scrambled by a Semi-Persistent Scheduling C-RNTI, etc. When the UE decodes a PDCCH with a DCI format, the UE may try to match several RNTIs that are configured to be decoded. The UE may then try to decode PDCCHs with the same or different DCI formats with those RNTIs, until the UE finishes checking all PDCCHs in the search space. This may be referred to as "blind decoding." In some implementations, only one C-RNTI may be configured for the UE and the C-RNTI may be used to decode PDCCHs with one or more DCI formats. However, according to the systems and methods disclosed herein, in addition to the behaviors of Rel-11 and before, the UE 102 may be allocated a second C-RNTI for the secondary radio connection in addition to the first C-RNTI for the primary radio connection. In addition to decoding each PDCCH with a CRC scrambled by a first C-RNTI in a common search space and a UE 102 specific search space of each serving cell of the primary connection, the UE 102 may be configured to decode each PDCCH with a CRC scrambled by a second C-RNTI in a common search space and a UE 102 specific search space of each serving cell of the secondary radio connection.

In some implementations, the UE operations module 124 may include one of the modules indicated in FIG. 1. For example, in one implementation, the UE operations module 124 may include only the random access procedure module 126. In another implementation, the UE operations module 124 may include only the C-RNTI interpreter 130. In other implementations, the UE operations module 124 may include multiple modules indicated in FIG. 1, and any combination thereof. For example, the UE 102 may include at least two of the random access procedure module 126, the C-RNTI interpreter 130 and the UE radio connection determination module 128.

The UE operations module 124 may provide information 148 to the one or more receivers 120. For example, the UE operations module 124 may inform the receiver(s) 120 when or when not to receive transmissions based on downlink scheduling information or a discontinuous reception (DRX) configuration, etc.

The UE operations module 124 may provide information 138 to the demodulator 114. For example, the UE operations module 124 may inform the demodulator 114 of a modulation pattern anticipated for transmissions from the eNB 160.

The UE operations module 124 may provide information 136 to the decoder 108. For example, the UE operations module 124 may inform the decoder 108 of an anticipated encoding for transmissions from the eNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include RRC messages.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the eNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the eNB 160. The one or more transmitters 158 may upconvert and transmit the modulated signal(s) 156 to one or more eNBs 160.

The eNB 160 may include one or more transceivers 176, one or more demodulators 172, one or more decoders 166, one or more encoders 109, one or more modulators 113, a data buffer 162 and an eNB operations module 182. For example, one or more reception and/or transmission paths may be implemented in an eNB 160. For convenience, only a single transceiver 176, decoder 166, demodulator 172, encoder 109 and modulator 113 are illustrated in the eNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180*a-n*. For example, the receiver 178 may receive and downconvert signals to produce one or more received signals 174. The one or more received signals 174 may be provided to a demodulator 172. The one or more transmitters 117 may transmit signals to the UE 102 using one or more antennas 180*a*-*n*. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The eNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PUSCH transmission data) that may be used by the eNB operations module 182 to perform one or more operations.

In general, the eNB operations module 182 may enable the eNB 160 to communicate with the one or more UEs 102 and to communicate with one or more network nodes (e.g., a mobility management entity (MME), serving gateway (S-GW), eNBs). The eNB operations module 182 may include one or more of a connection control message management module 194 and a C-RNTI management module 196.

The connection control message management module 194 may obtain a connection control message. In some implementations, obtaining a connection control message may include receiving a connection control message. For example, a PeNB (or a source SeNB) may receive a connection control message that was generated by a SeNB (or a target SeNB). A connection control message may include connection control information for a secondary radio connection. The message structure of the connection control message may be able to switch whether a dedicated RACH preamble identity is included or not. For example, the connection control message may direct the UE 102 to add a new connection or to perform a handover in a secondary radio connection. The connection control message may be included in the RRC connection reconfiguration message.

In another implementation, the connection control message management module 194 may generate a connection control message. For example, a SeNB (or a target SeNB) may generate the connection control message. As will be described in connection with at least one of FIGS. 16 and 17, the SeNB (or target SeNB) may generate the connection control message based on received information.

The eNB operations module 182 may also generate a RRC connection reconfiguration message to be signaled to the UE 102. The RRC connection reconfiguration message may or may not include a handover command and/or a connection control message. For example, the eNB 160 may receive the handover command and/or the connection control message from another eNB as a transparent container. The eNB 160 may generate a RRC connection reconfiguration message that may include the received transparent container and may send the RRC connection reconfiguration message to the UE 102.

The C-RNTI management module 196 may obtain a C-RNTI. For example, the C-RNTI management module 196 may obtain a second C-RNTI that corresponds to a secondary radio connection. According to one example, the eNB 160 (a PeNB, for example) may receive the C-RNTI from another eNB 160 (a SeNB, for example). In another example, the C-RNTI management module 196 may receive the C-RNTI from another device. For example, a SeNB may receive the C-RNTI from a network server.

In some implementations, the C-RNTI management module 196 may reserve a C-RNTI for a radio connection. For example, a SeNB may reserve the C-RNTI for a secondary radio connection. The SeNB may then send the reserved C-RNTI in a connection control message. The connection control message including the C-RNTI may be sent to the UE 102 via the RRC connection reconfiguration message.

In some implementations, the eNB operations module 182 may include one of the modules indicated in FIG. 1. For example, in one implementation, the eNB operations module 182 may include only the connection control message management module 194. In another example, the eNB operations module 182 may include only the C-RNTI management module 196. In other implementations, the eNB operations module 182 may include multiple modules indicated in FIG. 1. For example, the eNB operations module 182 may include the connection control message management module 194 and the C-RNTI management module 196.

The eNB operations module 182 may provide information 190 to the one or more receivers 178. For example, the eNB operations module 182 may inform the receiver(s) 178 when or when not to receive transmissions.

The eNB operations module 182 may provide information 188 to the demodulator 172. For example, the eNB operations module 182 may inform the demodulator 172 of a modulation pattern anticipated for transmissions from the UE(s) 102.

The eNB operations module 182 may provide information 186 to the decoder 166. For example, the eNB operations module 182 may inform the decoder 166 of an anticipated encoding for transmissions from the UE(s) 102.

The eNB operations module 182 may provide information 101 to the encoder 109. The information 101 may include data to be encoded and/or instructions for encoding. For example, the eNB operations module 182 may instruct the encoder 109 to encode transmission data 105 and/or other information 101. The other information 101 may include RRC messages.

The encoder 109 may encode transmission data 105 and/or other information 101 provided by the eNB operations module 182. For example, encoding the data 105 and/or other information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The eNB operations module 182 may provide information 103 to the modulator 113. This information 103 may include instructions for the modulator 113. For example, the eNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The eNB operations module 182 may provide information 192 to the one or more transmitters 117. This information 192 may include instructions for the one or more transmitters 117. For example, the eNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
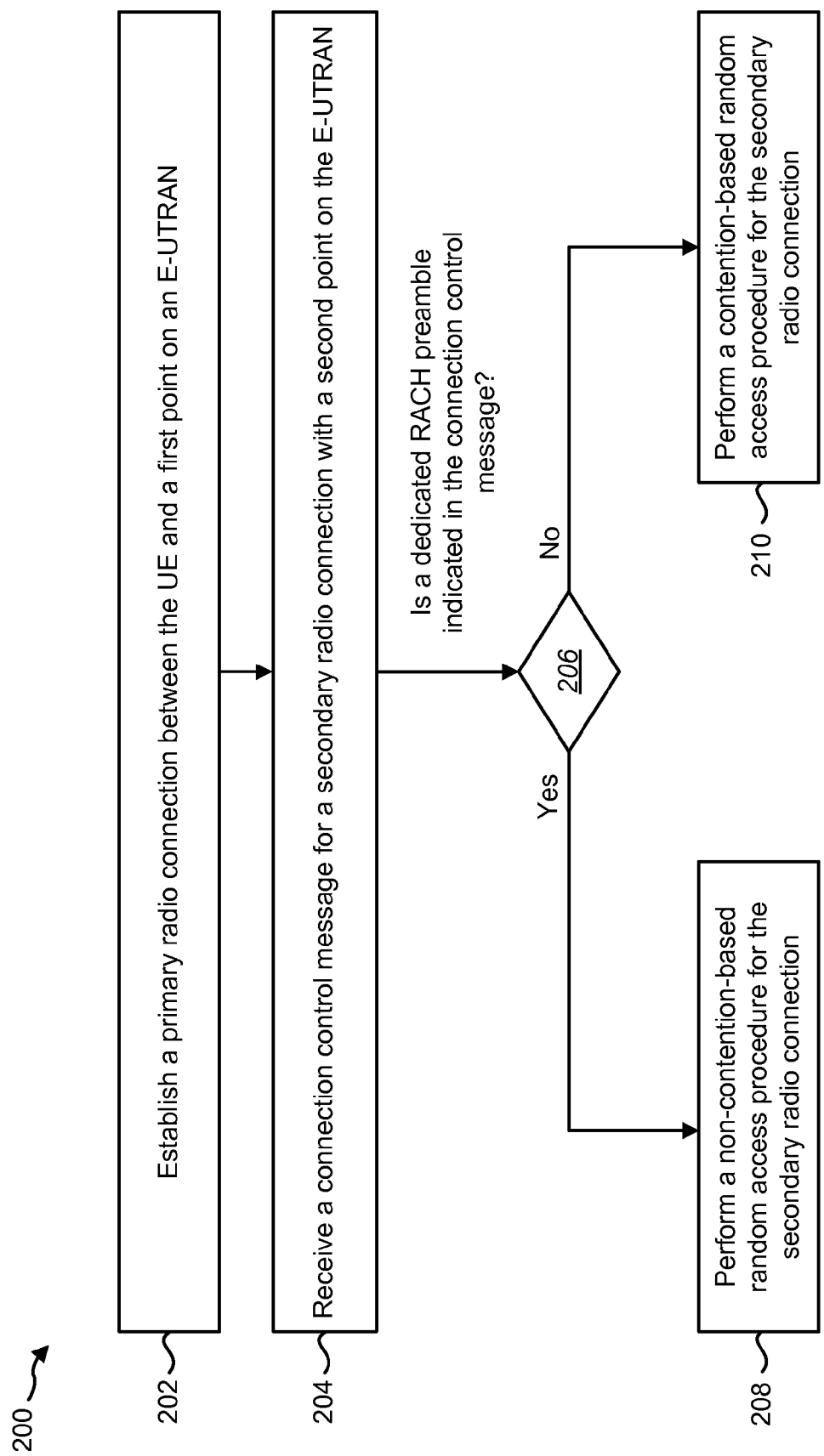
FIG. 2 is a flow diagram illustrating one configuration of a method for establishing multiple radio connections by a UE.

FIG. 2 is a flow diagram illustrating one configuration of a method 200 for establishing multiple radio connections by a UE 102. The UE 102 may establish 202 a primary radio connection between the UE 102 and a first point on an E-UTRAN. For example, a first eNB 160 (e.g., the first point) may belong to the E-UTRAN. In one configuration, the first eNB 160 may be a PeNB. The UE 102 may connect to the PeNB with a Uu interface. In another configuration, the first eNB 160 may be a SeNB.

The UE 102 may receive 204 a connection control message. For example, the UE 102 may receive 204 a RRC connection reconfiguration message (e.g., RRCConnectionReconfiguration message) that may include the connection control message (e.g., connection control information). The connection control message may be used as a connection control for a secondary radio connection. The connection control information may include one or more of a radio bearer configuration for a radio connection, a C-RNTI for a radio connection, a physical cell identifier for a cell, a dedicated RACH preamble identity, a security algorithm identifier, access parameters, system information blocks (SIBs), etc. The UE 102 may receive 204 the connection reconfiguration message from a first eNB 160 that may be either a PeNB or a source SeNB.

As described above, the connection control message may direct the UE 102 to perform at least one of an addition of connection (e.g., a secondary radio connection) and a handover in a radio connection. For example, the connection control message may direct the UE 102 to add a new connection between the UE 102 and the E-UTRAN. Adding a connection may include receiving a C-RNTI assigned for the radio connection. There may be several ways to assign a C-RNTI to the UE 102. An example is given as follows. Initially, a C-RNTI may be assigned in a MAC sublayer. In a random access procedure, a Temporary C-RNTI may be assigned. In some implementations, the Temporary C-RNTI may be included in a random access response message. In this implementation, the Temporary C-RNTI may be promoted to a C-RNTI when the UE 102 detects random access success and does not already have a C-RNTI. The C-RNTI may then be dropped by others. If the UE 102 detects random access success and already has a C-RNTI, the UE 102 may resume using its C-RNTI. For example, when the purpose of the random access is initial access from an RRC IDLE state or after a RRC connection re-establishment procedure, the UE 102 may not already have a C-RNTI. In this case, a Temporary C-RNTI may be promoted at the success of random access. This step may be performed in accordance with Rel-11 and before.

In another example, the RRC connection reconfiguration message that includes a handover command may direct the UE 102 to perform a handover in a radio connection. Performing a handover may include updating a C-RNTI of the UE 102. For example, if the UE 102 is in an RRC_CONNECTED state, the C-RNTI may be changed (e.g., updated) at a handover procedure. A new C-RNTI for a target PCell may be provided in a handover command (e.g., MobilityControlInfo) in a source PCell from the eNB 160 to the UE 102. This C-RNTI assignment may be done in a RRC sublayer. In this example, the UE 102 may have multiple C-RNTIs, but the new C-RNTI may be applied after initializing synchronizing to the downlink of the target PCell. This step may be performed in accordance with Rel-11 and before. Additionally, in some implementations, a connection control message included in the RRC connection reconfiguration message may include at least one of a C-RNTI for the second radio connection, a physical cell identifier for a target cell, a security algorithm identifier and a dedicated RACH preamble identity. This is a new procedure (for Rel-12 specifications, for example).

The UE 102 may perform a random access procedure for the secondary radio connection in response to receiving the connection control message. In response to the connection control message, The UE 102 may determine 206 if a dedicated RACH preamble is indicated in the connection control message. For example, the connection control message may include a parameter that indicates a dedicated RACH preamble. In a case that the UE 102 determines 206 that a dedicated RACH preamble is indicated in the connection control message, the UE 102 may perform 208 a non-contention-based random access procedure for the secondary radio connection. For example, a UE 102 may access a target cell, via the RACH, using a contention-free procedure. By comparison, in a case that the UE 102 determines 206 that a dedicated RACH preamble is not indicated in the connection control message, the UE 102 may perform 210 a contention-based random access procedure. For example, in response to the RRC connection configuration message that includes the connection control message, the UE 102 may perform a random access procedure.

Figure 3:
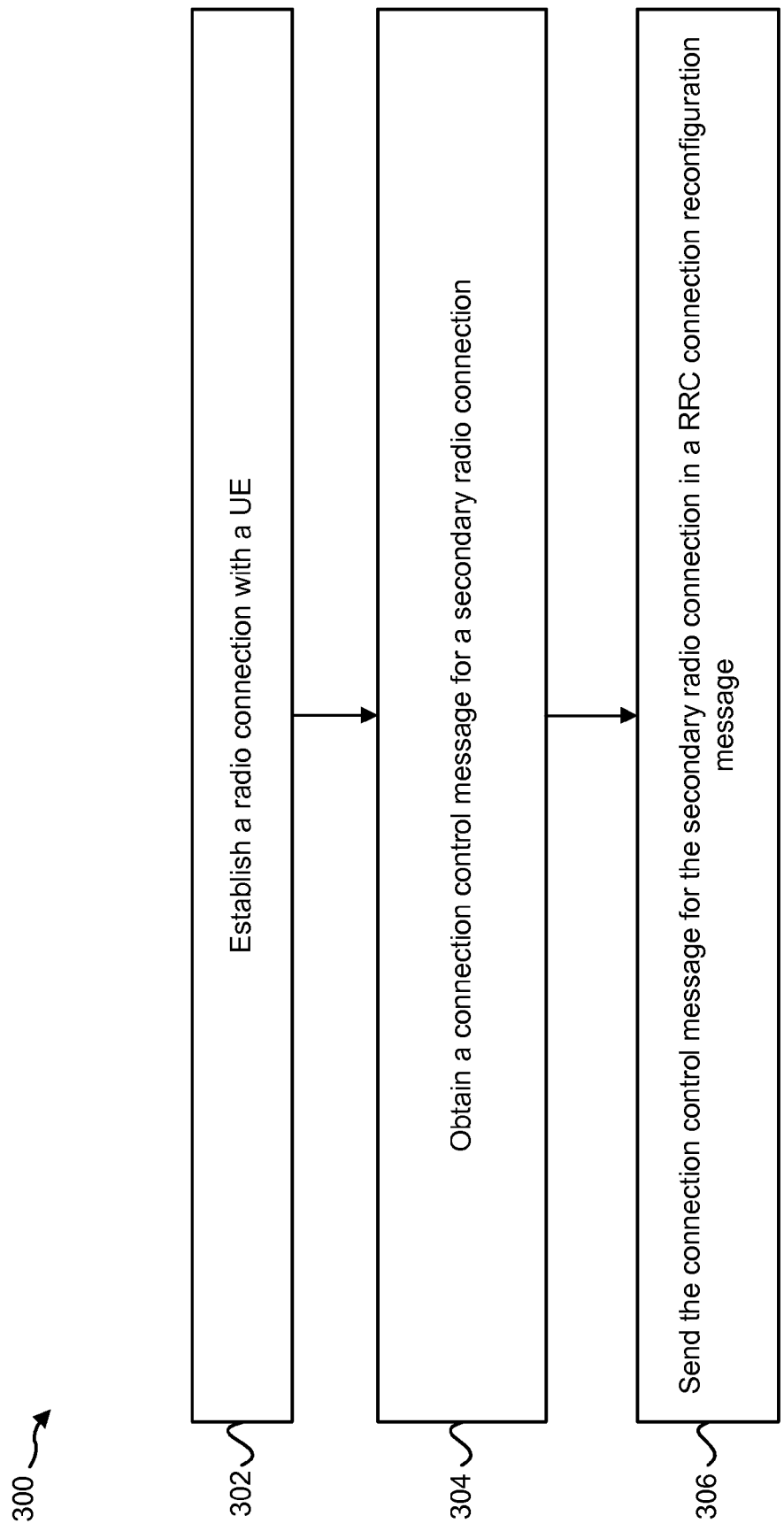
FIG. 3 is a flow diagram illustrating one configuration of a method for establishing multiple radio connections by an eNB.

FIG. 3 is a flow diagram illustrating one configuration of a method 300 for establishing multiple radio connections by an eNB 160. The eNB 160 may establish 302 a radio connection with the UE 102. For example, a first eNB 160 may belong to an E-UTRAN. In one configuration, the first eNB 160 may be a PeNB. The first eNB 160 may establish 302 a radio connection with the UE 102 using a Uu interface as described in connection with FIG. 1.

The eNB 160 may obtain 304 a connection control message for a secondary radio connection. The connection control message may indicate whether a dedicated RACH preamble is included in the connection control message. The connection control message (included in an RRC connection reconfiguration message, for example) may also be able to switch whether a dedicated RACH preamble identity is included or not.

In some implementations, obtaining 304 a connection control message may include receiving a connection control message. For example, as described above, a PeNB may receive the connection control message from a SeNB. In this example, the PeNB may send 306 the connection control message to the UE 102 (in a RRC connection reconfiguration message, for example). Another example of receiving a connection control message (in a RRC connection reconfiguration message, for example) is given as follows. A PeNB or a source SeNB may receive the connection control message from a target SeNB. In this example, the PeNB or the source SeNB may generate a RRC connection reconfiguration message including the connection control message. The PeNB or the source SeNB may then send 306 the RRC connection reconfiguration message including the connection control message to the UE 102.

In some implementations, the connection control message may be used for a handover between cells in a secondary radio connection. For example, the PeNB or the source SeNB may receive a connection control message from the target SeNB (not described in this example because the connection control message received from the target SeNB can be exchanged or shared between the PeNB and source SeNB). The PeNB or the source SeNB may send a RRC connection reconfiguration message (including the connection control message) to the UE 102 (not shown). In some examples, the connection control message may not be used. Instead, a handover command (e.g., MobilityControlInfo) may be used and the handover command in the secondary radio connection may be included in a secondary RRC connection reconfiguration message which is distinguished from the RRC connection reconfiguration message used in the primary radio connection. Then, a secondary RRC connection reconfiguration complete message may be sent from the UE 102 to the target SeNB as an acknowledgement to the secondary RRC connection reconfiguration message. The secondary RRC connection reconfiguration complete message may be distinguished from the RRC connection reconfiguration complete message used in the primary radio connection.

In other implementations, obtaining 304 a connection control message may include generating a connection control message. For example, a SeNB may generate the connection control message. The SeNB may generate the connection control message based on information received from another eNB (a PeNB, for example). In this example, the SeNB may send 306 the connection control message to the PeNB. The PeNB may then forward the connection control message to the UE 102 (in a RRC connection reconfiguration message, for example). Accordingly, the SeNB may send 306 the connection control message to the UE 102 via the PeNB.

Another example of generating a connection control message is given as follows. A target SeNB may generate the connection control message. In this example, the target SeNB may send 306 the connection control message to another eNB (e.g., a PeNB or a source SeNB). The other eNB may then forward the connection control message to the UE 102. Accordingly, the target SeNB may send 306 the connection control message to the UE 102 via another eNB.

Figure 4:
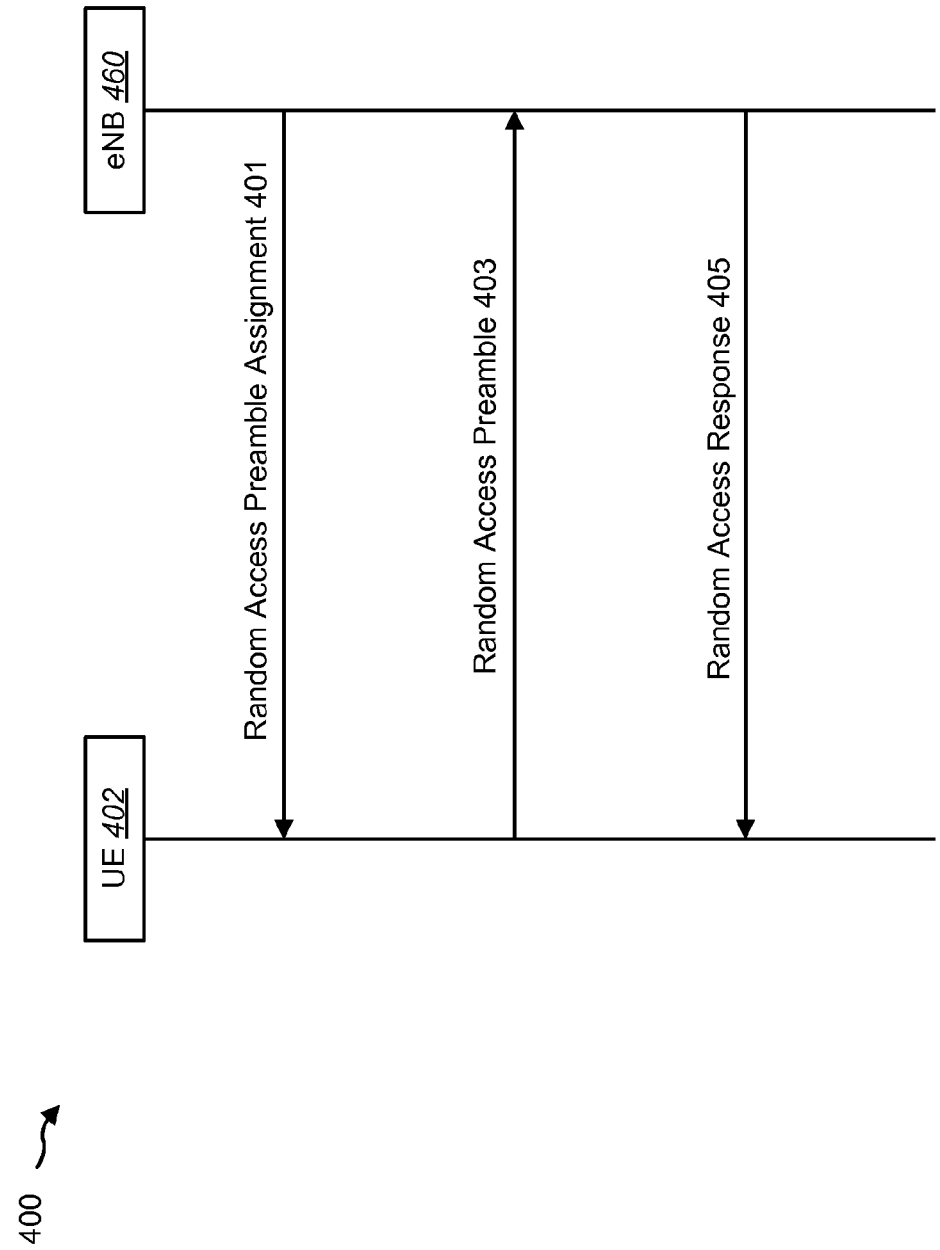
FIG. 4 is a thread diagram illustrating one configuration of a non-contention based random access procedure.

FIG. 4 is a thread diagram illustrating one configuration of a non-contention based random access procedure 400. The eNB 460 may send 401 a random access preamble assignment. For example, the eNB 460 may assign the UE 402 a non-contention random access preamble (e.g., a random access preamble that may not be within a set sent in broadcast signaling). In some implementations, the eNB 460 may assign 401 the random access preamble via a dedicated signaling in a downlink (via a dedicated RACH preamble identity, for example).

The UE 402 may then send 403 the assigned non-contention random access preamble to the eNB 460. In some implementations, the UE 402 may send 403 the assigned non-contention random access preamble on a RACH in an uplink transmission.

The eNB 460 may then send 405 a random access response to the UE 402. The random access response may be generated by MAC on DL-SCH. The UE 402 may receive the random access response.

Figure 5:
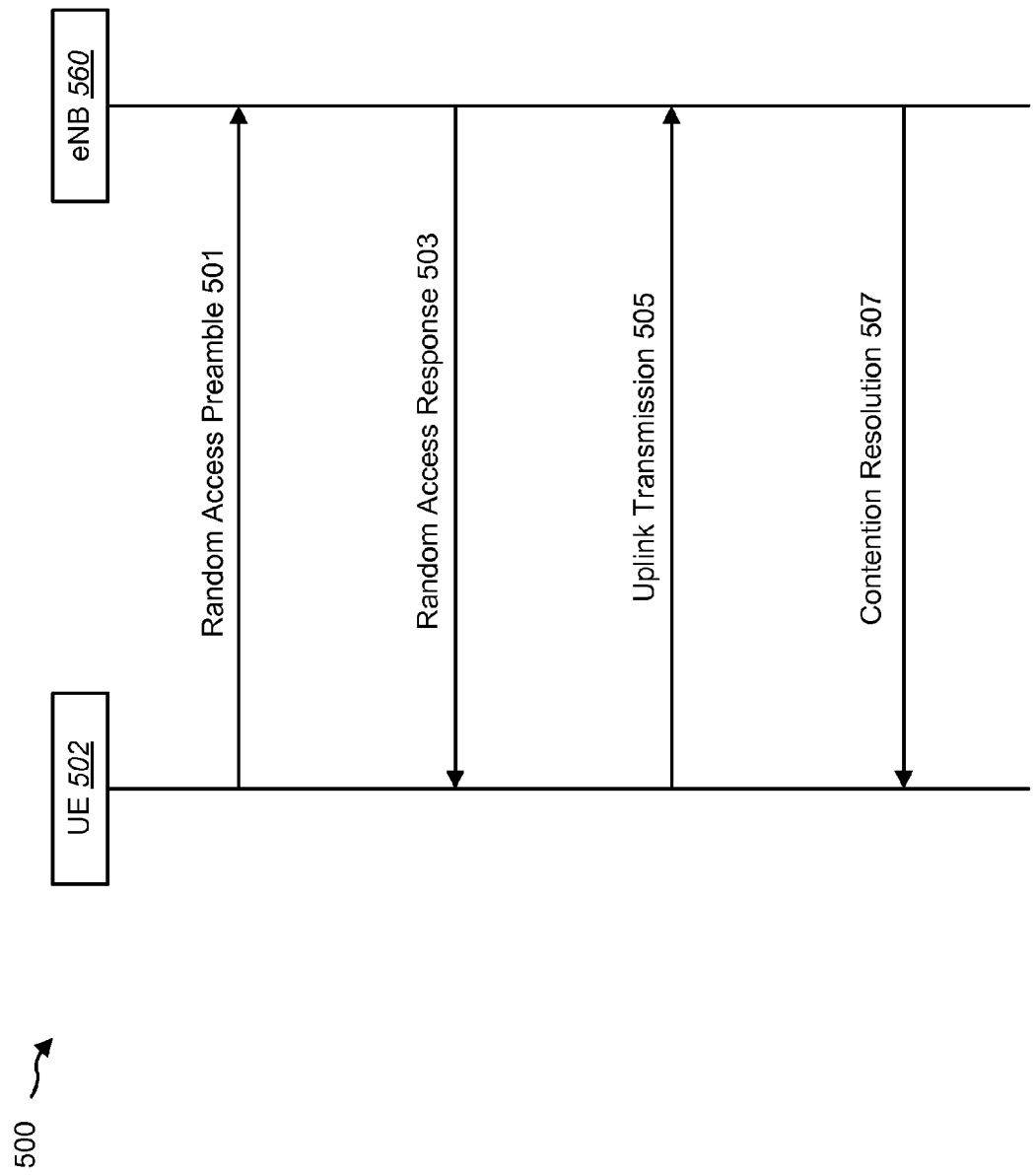
FIG. 5 is a thread diagram illustrating one configuration of a contention-based random access procedure.

FIG. 5 is a thread diagram illustrating one configuration of a contention-based random access procedure 500. The UE 502 may select a random access preamble. For example, the UE 502 may select a random access preamble randomly from a set that may be informed in broadcast signaling. The UE 502 may then send 501 the randomly selected random access preamble to the eNB 560 (on a RACH in an uplink transmission, for example).

The eNB 560 may send 503 a random access response. The UE 502 may receive the random access response. The random access response may include a Temporary C-RNTI. The random access response may be generated by MAC on DL-SCH.

The UE 502 may then send 505 a first scheduled uplink transmission on UL-SCH. In other words, the UE 502 may send 505 an uplink transmission scheduled by the Temporary C-RNTI.

The eNB 560 may send 507 a contention resolution, which may be received by the UE 502. The contention resolution may include information that confirms that the UE 502 is identified.

Figure 6:
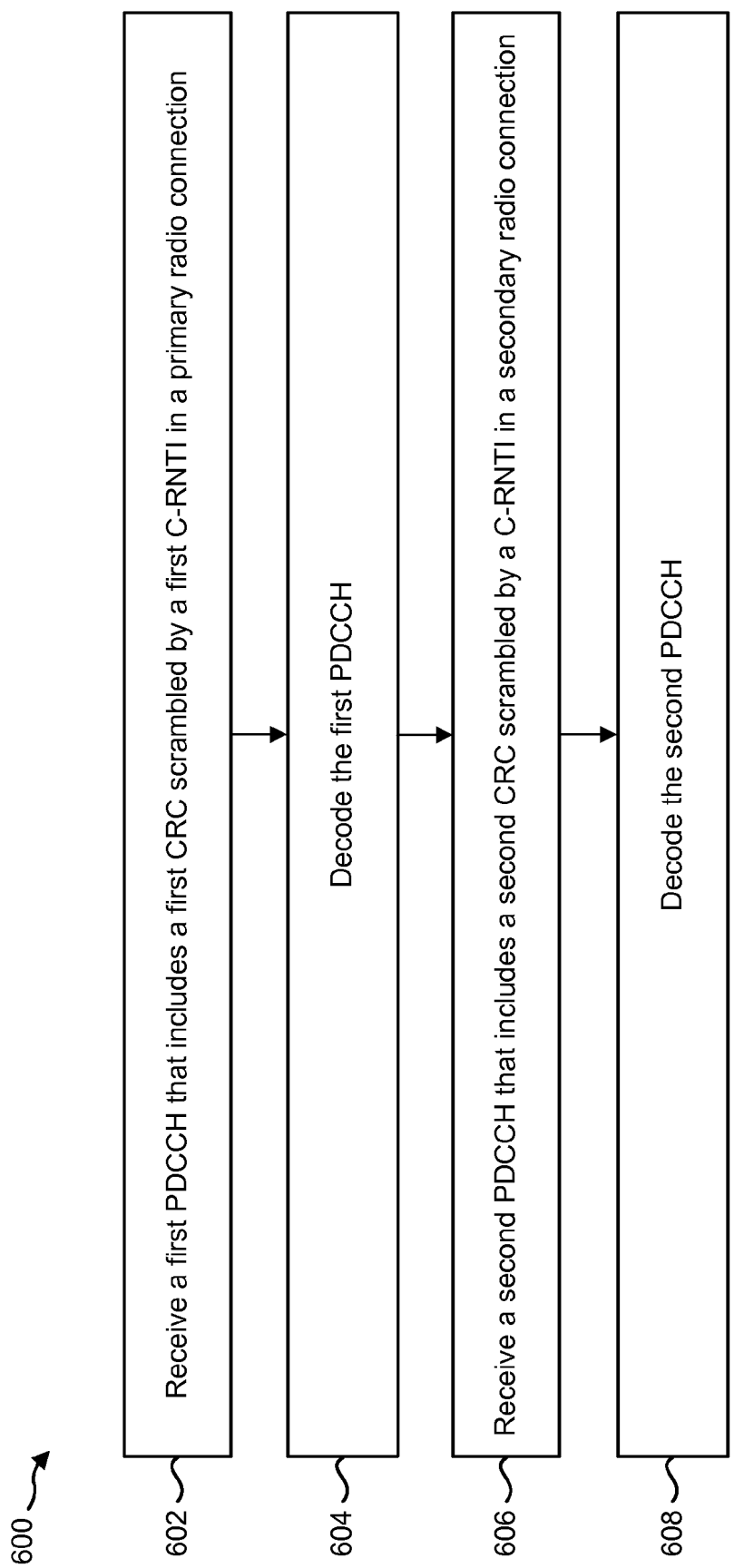
FIG. 6 is a flow diagram illustrating another configuration of a method for establishing multiple radio connections by a UE.

FIG. 6 is a flow diagram illustrating another configuration of a method 600 for establishing multiple radio connections by a UE 102. The UE 102 may receive 602 a first PDCCH. The first PDCCH may include a first CRC that may be scrambled by a first C-RNTI in a primary radio connection. As used herein, the term PDCCH may refer to a PDCCH or an EPDCCH. For instance, an EPDCCH may be one example of a PDCCH. The first PDCCH (or the first EPDCCH) may include a first RNTI (e.g., a first C-RNTI) that may be implicitly coded with the first CRC. For example, a first set of CRC parity bits may be scrambled by the first C-RNTI.

The UE 102 may then decode 604 the first PDCCH (or the first EPDCCH). Decoding 604 the first PDCCH may include interpreting the first PDCCH as described in connection with FIG. 1. The first PDCCH may be transmitted from the eNB 160 to the UE 102 in a primary radio connection.

The UE 102 may receive 606 a second PDCCH. The second PDCCH may include a second CRC that may be scrambled by a second C-RNTI in a secondary radio connection. The second PDCCH (or the second EPDCCH) may include a second C-RNTI that may be implicitly coded with the second CRC. For example, a second set of CRC parity bits may be scrambled by the second C-RNTI.

The UE 102 may then decode 608 the second PDCCH (or the second EPDCCH). Decoding 608 the second PDCCH may include interpreting the second PDCCH as described in connection with FIG. 1. The second PDCCH may be transmitted from the eNB 160 to the UE 102 in the secondary radio connection.

Figure 7:
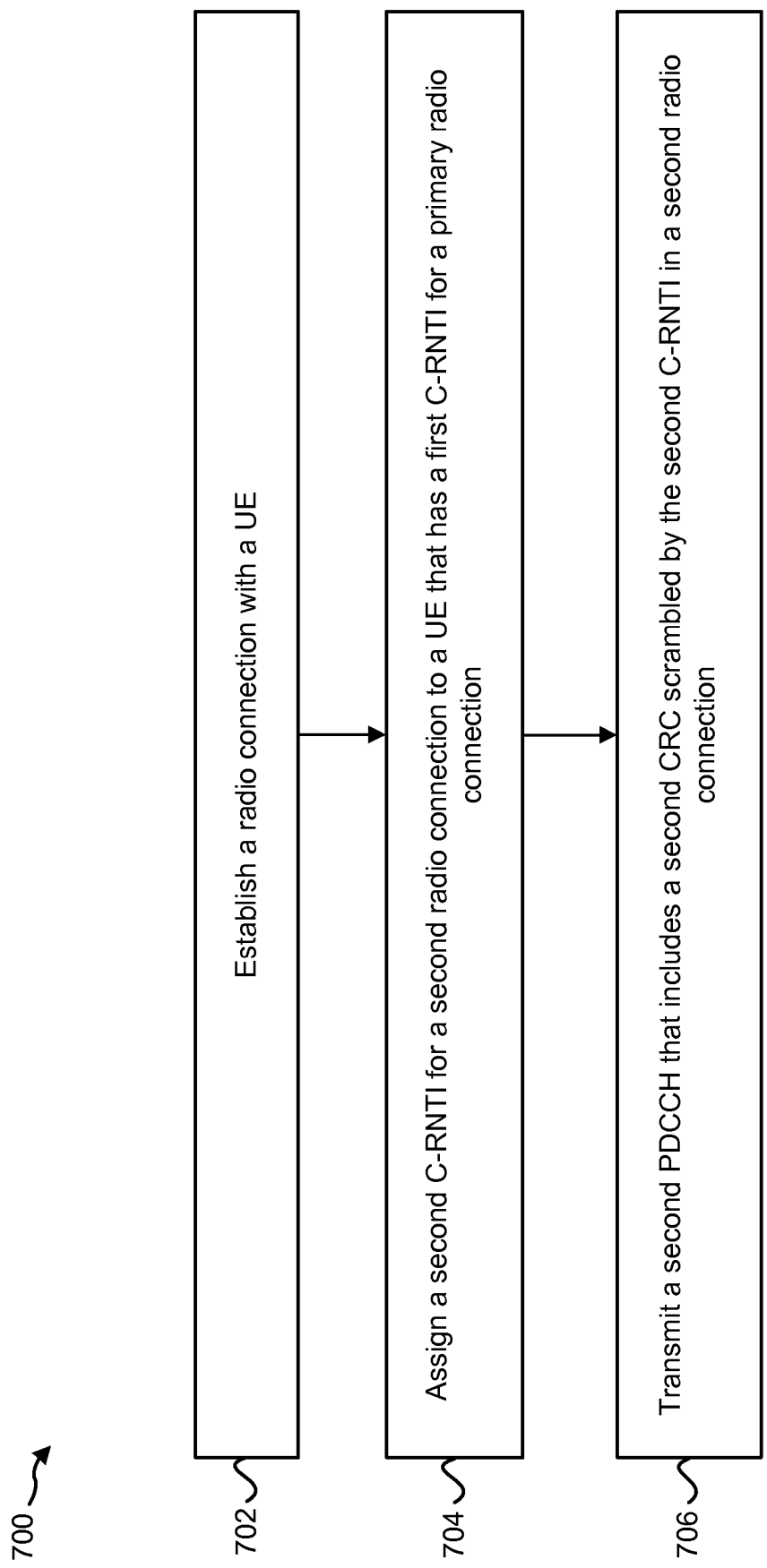
FIG. 7 is a flow diagram illustrating another configuration of a method for establishing multiple radio connections by an eNB.

FIG. 7 is a flow diagram illustrating another configuration of a method 700 for establishing multiple radio connections by an eNB 160. The eNB 160 may establish 702 a radio connection with the UE 102. In some implementations, this may be performed as described in connection with FIG. 3.

The eNB 160 may manage a second C-RNTI for a secondary radio connection. For example, the eNB 160 may assign 704 a second C-RNTI for a second radio connection to the UE 102 that has a first C-RNTI for a primary radio connection. Assigning a C-RNTI to each radio connection may allow for greater flexibility of radio resource management. In some implementations, managing a second C-RNTI may include receiving the C-RNTI from another device (another eNB 160 (e.g., a SeNB) or a server, for example). For example, a PeNB may receive the second C-RNTI for a secondary radio connection from a SeNB that reserved the second C-RNTI. In this example, the eNB 160 may send the second C-RNTI to a UE 102. It should be noted that the second C-RNTI may be included in a connection control message included in a RRC connection reconfiguration message from the eNB 160 to the UE 102.

In another example, managing a second C-RNTI may include generating the second C-RNTI. Generating the second C-RNTI may include reserving a C-RNTI. For example, a SeNB may reserve a C-RNTI for the secondary radio connection. In this example, the SeNB may send the second C-RNTI to another eNB (e.g., a PeNB or a source SeNB), for example. The eNB 160 may then send the second C-RNTI to the UE 102. The second C-RNTI may be included in a connection control message included in a RRC connection reconfiguration message from the eNB 160 to the UE 102.

The eNB 160 may transmit 706 a second PDCCH that includes a second CRC scrambled by the second C-RNTI in a secondary radio connection. For example, after the UE 102 is allocated the second C-RNTI by the connection control message, the UE 102 has the second C-RNTI. After the UE 102 has the second C-RNTI for the secondary radio connection, transmitting 706 the second C-RNTI may include scrambling a set of CRC parity bits based on the second C-RNTI, as described above. In this example, the eNB 160 may transmit 706 the C-RNTI (and the corresponding CRC) in a PDCCH (or an EPDCCH). It should be noted that the eNB 160 may send the C-RNTI to the UE 102 directly or indirectly (via another eNB, for example).

Figure 8:
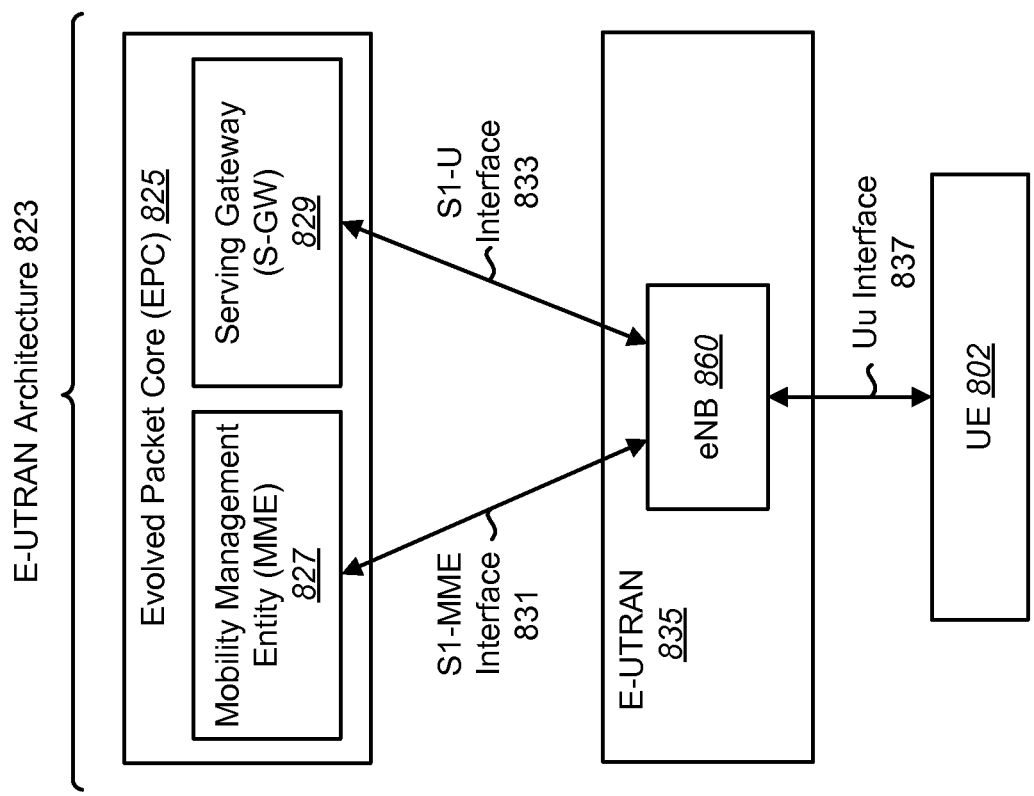
FIG. 8 is a block diagram illustrating one configuration of an Evolved Universal Terrestrial Radio Access Network (E-UTRAN) architecture in which systems and methods for establishing multiple radio connections may be implemented.

FIG. 8 is a block diagram illustrating one configuration of an E-UTRAN architecture 823 in which systems and methods for establishing multiple radio connections may be implemented. The UE 802 described in connection with FIG. 8 may be implemented in accordance with the UE 102 described in connection with FIG. 1. The eNB 860 described in connection with FIG. 8 may be implemented in accordance with the eNB 160 described in connection with FIG. 1. In the E-UTRAN architecture 823, the E-UTRAN 835 may include one or more eNBs 860, providing the E-UTRA user plane (packet data convergence protocol (PDCP)/radio link control (RLC)/MAC/PHY) and control plane (RRC) protocol terminations toward the UE 802. The eNBs 860 may be interconnected with each other by an X2 interface (not shown in the figure). The eNBs 860 may also be connected by the S1 interfaces 831, 833 to the evolved packet core (EPC) 825. For instance, the eNBs 860 may be connected to a mobility management entity (MME) 827 by the S1-MME 831 interface and to the serving gateway (S-GW) 829 by the S1-U interface 833. The S1 interfaces 831, 833 may support a many-to-many relation between MMEs 827, S-GWs 829 and the eNBs 860. The S1-MME interface 831 may be the S1 interface for the control plane and the S1-U interface 833 may be the S1 interface for the user plane. The Uu interface 837 may be a radio interface between the UE 802 and the eNB 860 for the radio protocol of E-UTRAN 835.

The eNBs 860 may host a variety of functions. For example, the eNBs 860 may host functions for radio resource management (e.g., radio bearer control, radio admission control, connection mobility control, dynamic allocation of resources to UEs 802 in both uplink and downlink (scheduling)). The eNBs 860 may also perform IP header compression and encryption of a user data stream, selection of an MME 827 at UE 802 attachment when no routing to an MME 827 can be determined from the information provided by the UE 802 and routing of user plane data towards the serving gateway 829. The eNBs 860 may additionally perform scheduling and transmission of paging messages (originated from the MME 827); scheduling and transmission of broadcast information (originated from the MME 827 or operation and maintenance (O&M)); measurement and measurement reporting configuration for mobility and scheduling; and scheduling and transmission of the public warning system (PWS) (which may include the earthquake and tsunami warning system (ETWS) and commercial mobile alert system (CMAS)) messages (originated from the MME 827). The eNBs 860 may further perform closed subscriber group (CSG) handling and transport-level packet marking in the uplink.

The MME 827 may host a variety of functions. For example, the MME 827 may perform Non-Access Stratum (NAS) signaling, NAS signaling security, access stratum (AS) security control, inter core network (CN) node signaling for mobility between 3GPP access networks, and idle mode UE Reachability (including control and execution of paging retransmission). The MME 827 may also perform tracking area list management (for a UE 802 in idle and active mode), packet data network gateway (PDN GW) and S-GW selection, MME 827 selection for handovers with MME 827 change and Serving GPRS Support Node (SGSN) selection for handovers to 2G or 3G 3GPP access networks. The MME 827 may additionally host roaming, authentication and bearer management functions (including dedicated bearer establishment). The MME 827 may provide support for PWS (which includes ETWS and CMAS) message transmission, and may optionally perform paging optimization.

The S-GW 829 may also host the following functions. The S-GW 829 may host the local mobility anchor point for inter-eNB 860 handover. The S-GW 829 may perform mobility anchoring for inter-3GPP mobility, E-UTRAN idle mode downlink packet buffering and initiation of network triggered service request procedure, lawful interception and packet routing and forwarding. The S-GW 829 may also perform transport-level packet marking in the uplink and the downlink, accounting on user and QoS Class Identifier (QCI) granularity for inter-operator charging, and UL and DL charging per UE 802, packet data network (PDN) and QCI.

Signaling Radio Bearers (SRBs) are Radio Bearers (RB) that may be used only for the transmission of RRC and NAS messages. Three SRBs are defined. SRB0 may be used for RRC messages using the CCCH logical channel. SRB1 may be used for RRC messages (which may include a piggybacked NAS message) as well as for NAS messages prior to the establishment of SRB2, all using the DCCH logical channel. SRB2 may be used for RRC messages, which include logged measurement information as well as for NAS messages, all using the DCCH logical channel. SRB2 has a lower priority than SRB1 and may be configured by the E-UTRAN 835 after security activation.

RRC connection establishment may involve the establishment of SRB1. Upon initiating the initial security activation procedure, the E-UTRAN 835 may initiate the establishment of SRB2 and DRBs. The E-UTRAN 835 may do this prior to receiving the confirmation of the initial security activation from the UE 802. PDCP may be established for each SRB1, SRB2 and DRB. RLC may be established for each SRB0, SRB1, SRB2 and DRB.

RRC may be responsible for the establishment, maintenance and release of an RRC connection between the UE 802 and the E-UTRAN 835, including allocation of temporary identifiers between the UE 802 and the E-UTRAN 835 and configuration of SRBs for RRC connection, etc. RRC may be responsible for the establishment, configuration, maintenance and release of point-to-point RBs.

Figure 9:
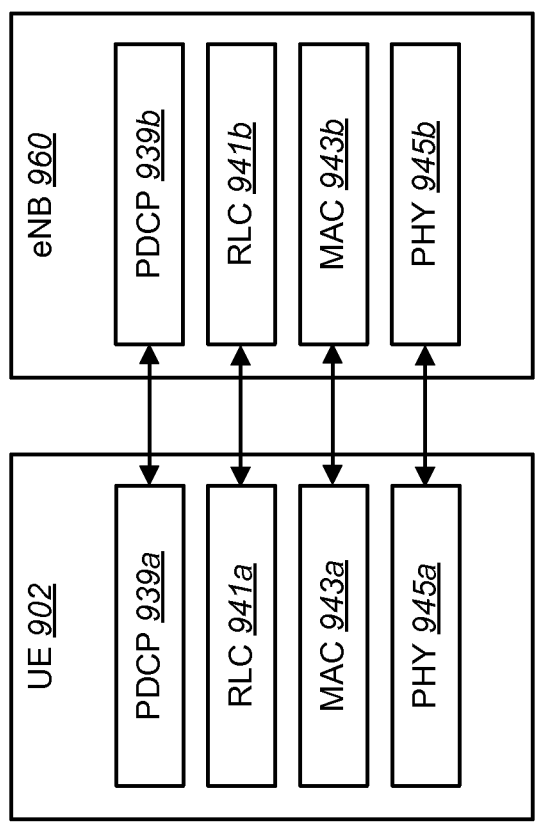
FIG. 9 is a block diagram illustrating one configuration of a user plane protocol stack.

FIG. 9 is a block diagram illustrating one configuration of a user plane protocol stack. The UE 902 described in connection with FIG. 9 may be implemented in accordance with the UE 102 described in connection with FIG. 1. The eNB 960 described in connection with FIG. 9 may be implemented in accordance with the eNB 160 described in connection with FIG. 1. The user plane protocol stack for the UE 902 may include PDCP 939*a*, RLC 941*a*, MAC 943*a* and PHY 945*a* sublayers. The user plane protocol stack for the eNB 960 may include corresponding PDCP 939*b*, RLC 941*b*, MAC 943*b* and PHY 945*b* sublayers. The PDCP 939*b*, RLC 941*b*, MAC 943*b* and PHY 945*b* sublayers (which terminate at the eNB 960 on the network) may perform functions (e.g., header compression, ciphering, scheduling, Automatic Repeat Request (ARQ) and Hybrid Automatic Repeat Request (HARQ)) for the user plane. Different entities may be identified by the corresponding sublayer. For example, PDCP entities are located in the PDCP 939 sublayer, RLC entities are located in the RLC sublayer 941, MAC entities are located in the MAC sublayer 943 and PHY entities are located in the PHY sublayer 945.

It should be noted that in multi-connectivity, the UE 902 may have more than one PHY entity and more than one MAC entity. One radio connection (e.g., radio interface) may include one PHY entity and one MAC entity. For example, a primary radio connection may include one PHY entity and one MAC entity and a secondary radio connection may include one PHY entity and one MAC entity. To enable flexibility of radio resource management for each network node, a distinct C-RNTI may be assigned for each radio connection.

Figure 10:
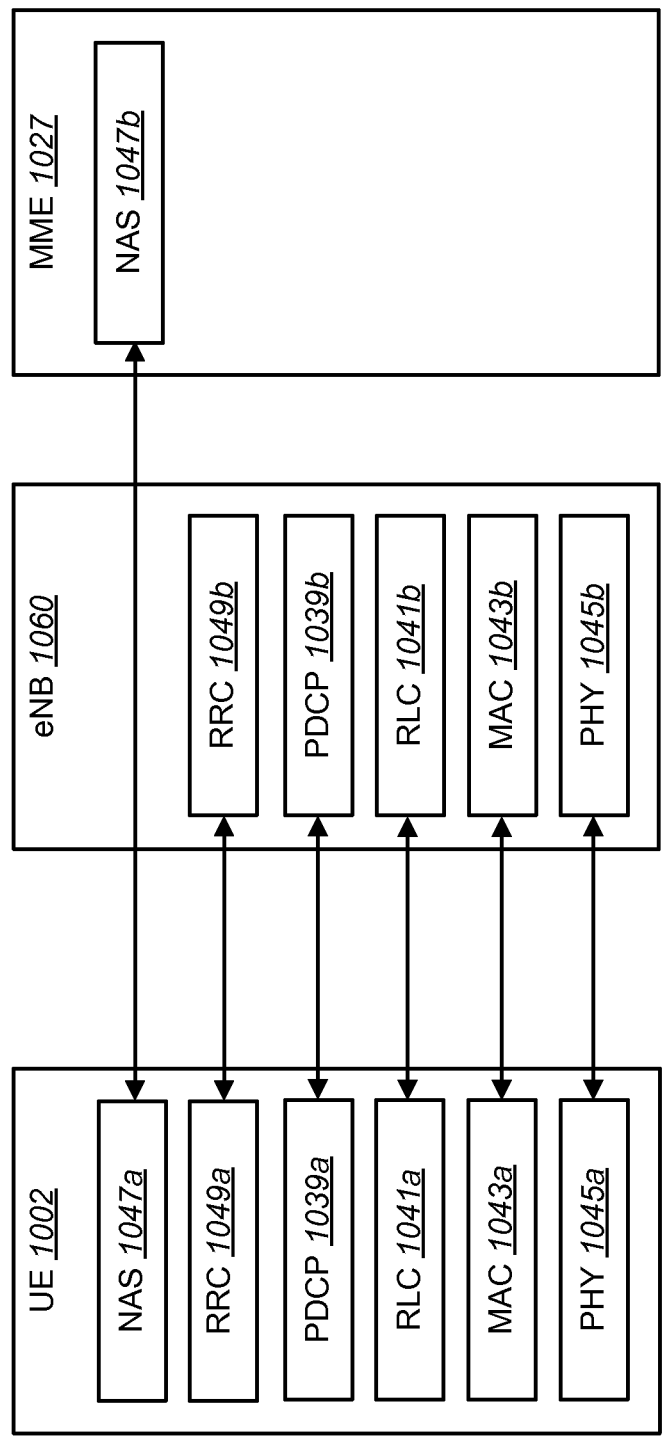
FIG. 10 is a block diagram illustrating one configuration of a control plane protocol stack.

FIG. 10 is a block diagram illustrating one configuration of a control plane protocol stack. The UE 1002 described in connection with FIG. 10 may be implemented in accordance with the UE 102 described in connection with FIG. 1. The eNB 1060 described in connection with FIG. 10 may be implemented in accordance with the eNB 160 described in connection with FIG. 1. The MME 1027 described in connection with FIG. 10 may be implemented in accordance with the MME 827 described in connection with FIG. 8.

The control plane protocol stack for the UE 1002 may include PDCP 1039a, RLC 1041a, MAC 1043a and PHY 1045a sublayers. The UE 1002 may also include a NAS 1047a and a RRC 1049a sublayer. The control plane protocol stack for the eNB 1060 may include RRC 1049b, PDCP 1039b, RLC 1041b, MAC 1043b and PHY 1045b sublayers. The MME 1027 may include a NAS 1047b sublayer. The PDCP 1039b sublayer (terminated in eNB 1060 on the network side) may perform functions (e.g., ciphering and integrity protection) for the control plane. The RLC 1041b and MAC 1043b sublayers (terminated in eNB 1060 on the network side) may perform the same functions as for the user plane.

The RRC 1049b sublayer (terminated in eNB 1060 on the network side) may perform the following functions. The RRC 1049b sublayer may perform broadcast functions, paging, RRC 1049 connection management, radio bearer (RB) control, mobility functions, UE 1002 measurement reporting and control. The NAS 1047 control protocol (terminated in MME 1027 on the network side) may perform, among other things, evolved packet system (EPS) bearer management, authentication, evolved packet system connection management (ECM)-IDLE mobility handling, paging origination in ECM-IDLE and security control.

Figure 11:
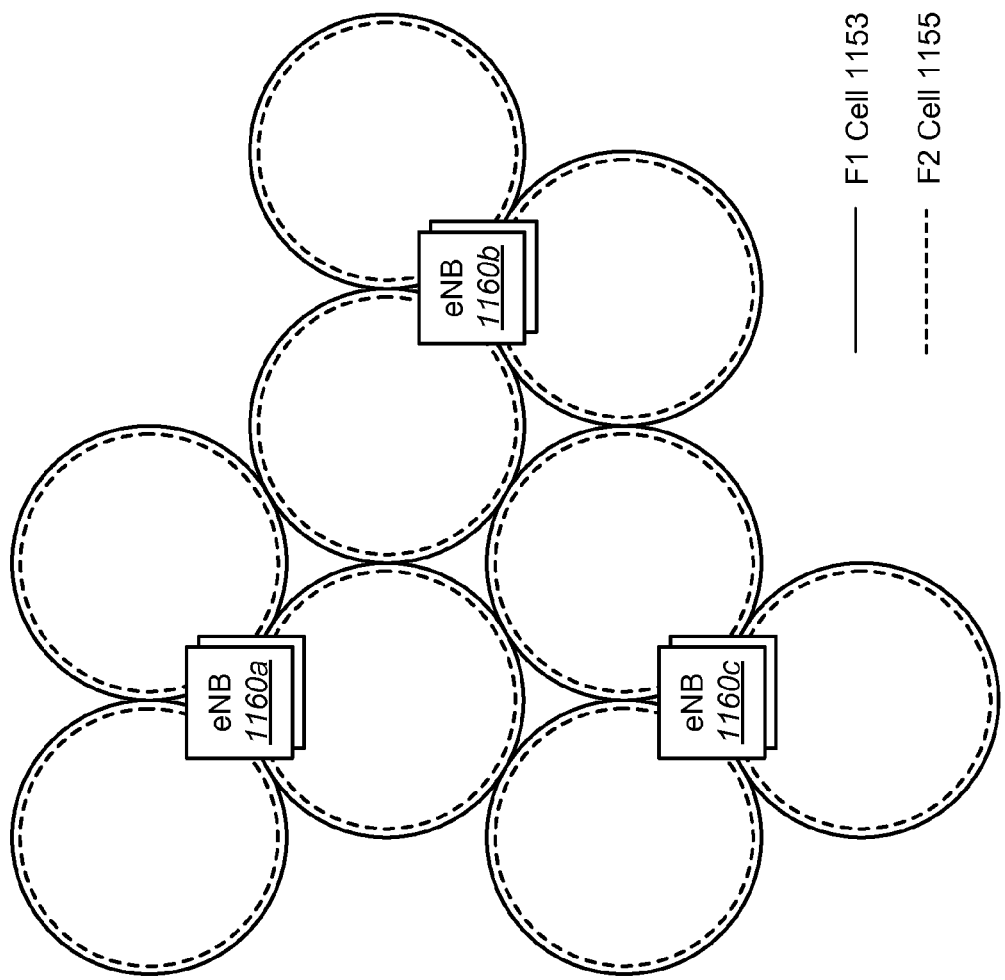
FIG. 11 is a block diagram illustrating a carrier aggregation configuration in which a first cell and a second cell are co-located, overlaid and have approximately equal coverage.

FIG. 11 is a block diagram illustrating a carrier aggregation configuration in which a first cell 1153 and a second cell 1155 are co-located, overlaid and have approximately equal coverage. In traditional carrier aggregation, two or more component carriers (CCs) may be aggregated to support wider transmission bandwidths (e.g., up to 100 MHz). A UE 102 may simultaneously receive or transmit on one or multiple CCs depending on the capabilities of the UE 102. For example, according to Rel-10 and later, a UE 102 with reception and/or transmission capabilities for carrier aggregation may simultaneously receive and/or transmit on multiple CCs corresponding to multiple serving cells. According to Rel-8 and Rel-9, a UE 102 may receive on a single CC and transmit on a single CC corresponding to one serving cell.

When carrier aggregation is configured, the UE 102 may have one RRC connection with the network. One radio interface may provide carrier aggregation. During RRC connection establishment, re-establishment and handover, one serving cell may provide NAS mobility information (e.g., a tracking area identity (TAI)). During RRC connection re-establishment and handover, one serving cell may provide a security input. This cell may be referred to as the primary cell (PCell). In the downlink, the component carrier corresponding to the PCell may be the downlink primary component carrier (DL PCC), while in the uplink it may be the uplink primary component carrier (UL PCC).

Depending on UE 102 capabilities, one or more SCells may be configured to form together with the PCell a set of serving cells. In the downlink, the component carrier corresponding to a SCell may be a downlink secondary component carrier (DL SCC), while in the uplink it may be an uplink secondary component carrier (UL SCC).

The configured set of serving cells for the UE 102, therefore, may consist of one PCell and one or more SCells. For each SCell, the usage of uplink resources by the UE 102 (in addition to the downlink resources) may be configurable. The number of DL SCCs configured may be larger than or equal to the number of UL SCCs and no SCell may be configured for usage of uplink resources only.

From a UE 102 viewpoint, each uplink resource may belong to one serving cell. The number of serving cells that may be configured depends on the aggregation capability of the UE 102. The PCell may only be changed using a handover procedure (e.g., with a security key change and a RACH procedure). The PCell may be used for transmission of the PUCCH. Unlike the SCells, the PCell may not be de-activated. Re-establishment may be triggered when the PCell experiences radio link failure (RLF), not when the SCells experience RLF. Furthermore, NAS information may be taken from the PCell.

The reconfiguration, addition and removal of SCells may be performed by RRC. At intra-LTE handover, RRC may also add, remove or reconfigure SCells for usage with a target PCell. When adding a new SCell, dedicated RRC signaling may be used for sending all required system information of the SCell (e.g., while in connected mode, UEs 102 need not acquire broadcasted system information directly from the SCells).

As illustrated in FIG. 11, one carrier aggregation deployment configuration may include frequency 1 (F1) cells 1153 and frequency 2 (F2) cells 1155 that are co-located and overlaid. It should be noted that carrier aggregation scenarios (e.g., deployment configurations) may be independent of small cell scenarios. The eNBs 1160a-c described in connection with FIG. 11 may be implemented in accordance with the eNB 160 described in connection with FIG. 1. In this configuration, multiple eNBs 1160a-c may provide coverage for the F1 cells 1153 and the F2 cells 1155. The systems and methods disclosed herein may be used to establish radio interfaces between the F1 cells 1153 and the F2 cells 1155.

The coverage of the F1 cells 1153 and the F2 cells 1155 may be the same or nearly the same. Both layers (e.g., frequency layers) may provide sufficient coverage and mobility may be supported on both layers. A likely scenario for this configuration may be when the F1 cells 1153 and the F2 cells 1155 are of the same band (e.g., 2 gigahertz (GHz), 800 MHz, etc.). It is expected that carrier aggregation may be possible between the overlaid F1 cells 1153 and the F2 cells 1155.

Figure 12:
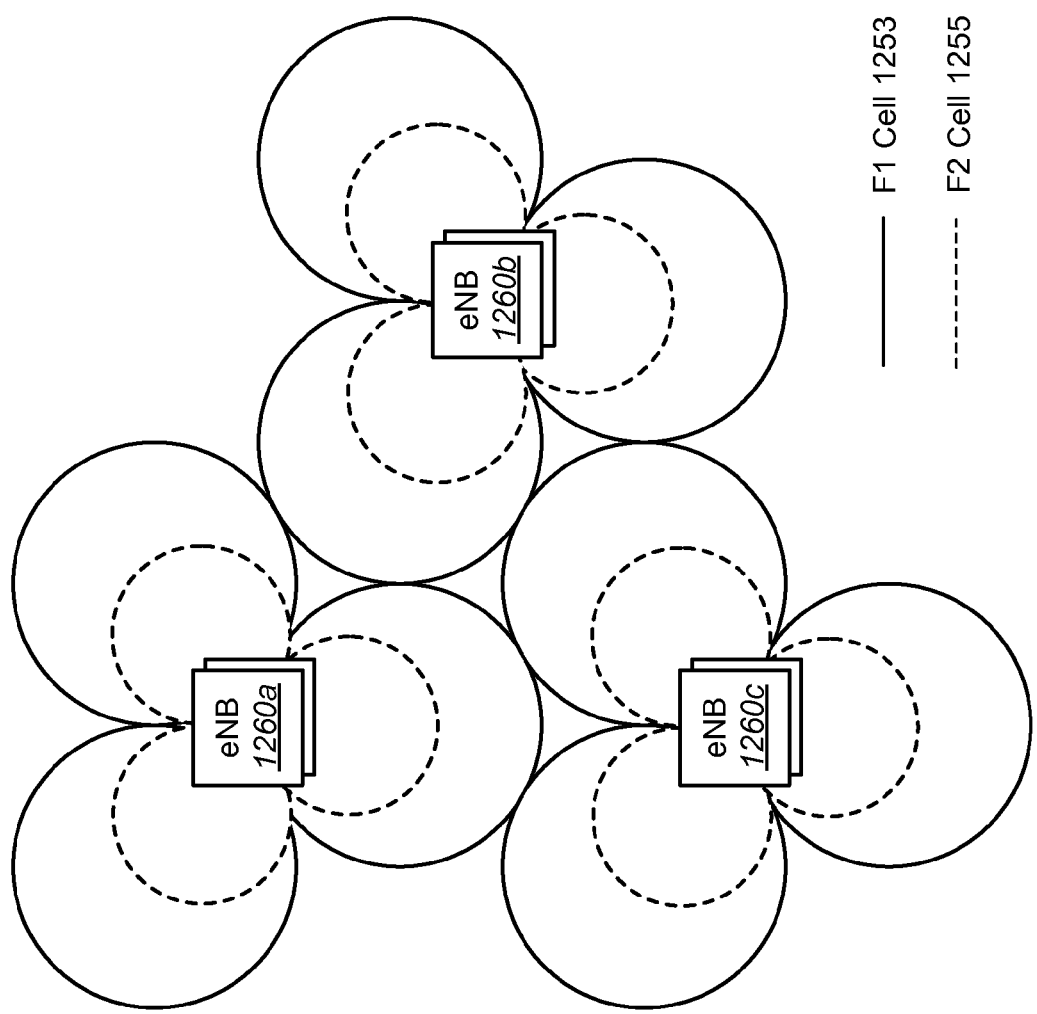
FIG. 12 is a block diagram illustrating a carrier aggregation configuration in which a first cell and a second cell are co-located and overlaid, but the second cell has smaller coverage.

FIG. 12 is a block diagram illustrating a carrier aggregation configuration in which a first cell 1253 and a second cell 1255 are co-located and overlaid, but the second cell 1255 has smaller coverage. The eNBs 1260a-c described in connection with FIG. 12 may be implemented in accordance with the eNB 160 described in connection with FIG. 1. In this configuration, multiple eNBs 1260a-c may provide coverage for the F1 cells 1253 and the F2 cells 1255. The systems and methods disclosed herein may be used to establish radio interfaces between the F1 cells 1253 and the F2 cells 1255.

In this configuration, the F1 cells 1253 and the F2 cells 1255 may be co-located and overlaid, but the F2 cells 1255 may have smaller coverage due to larger path loss. Only the F1 cells 1253 may provide sufficient coverage and the F2 cells 1255 may be used to improve throughput. Mobility may be performed based on F1 cell 1253 coverage. A likely scenario for this configuration may be when the F1 cells 1253 and the F2 cells 1255 are of different bands. For example, the F1 cells 1253 may equal 800 MHz or 2 GHz and the F2 cells 1255 may equal 3.5 GHz, etc. It is expected that carrier aggregation may be possible between the overlaid F1 cells 1253 and the F2 cells 1255.

Figure 13:
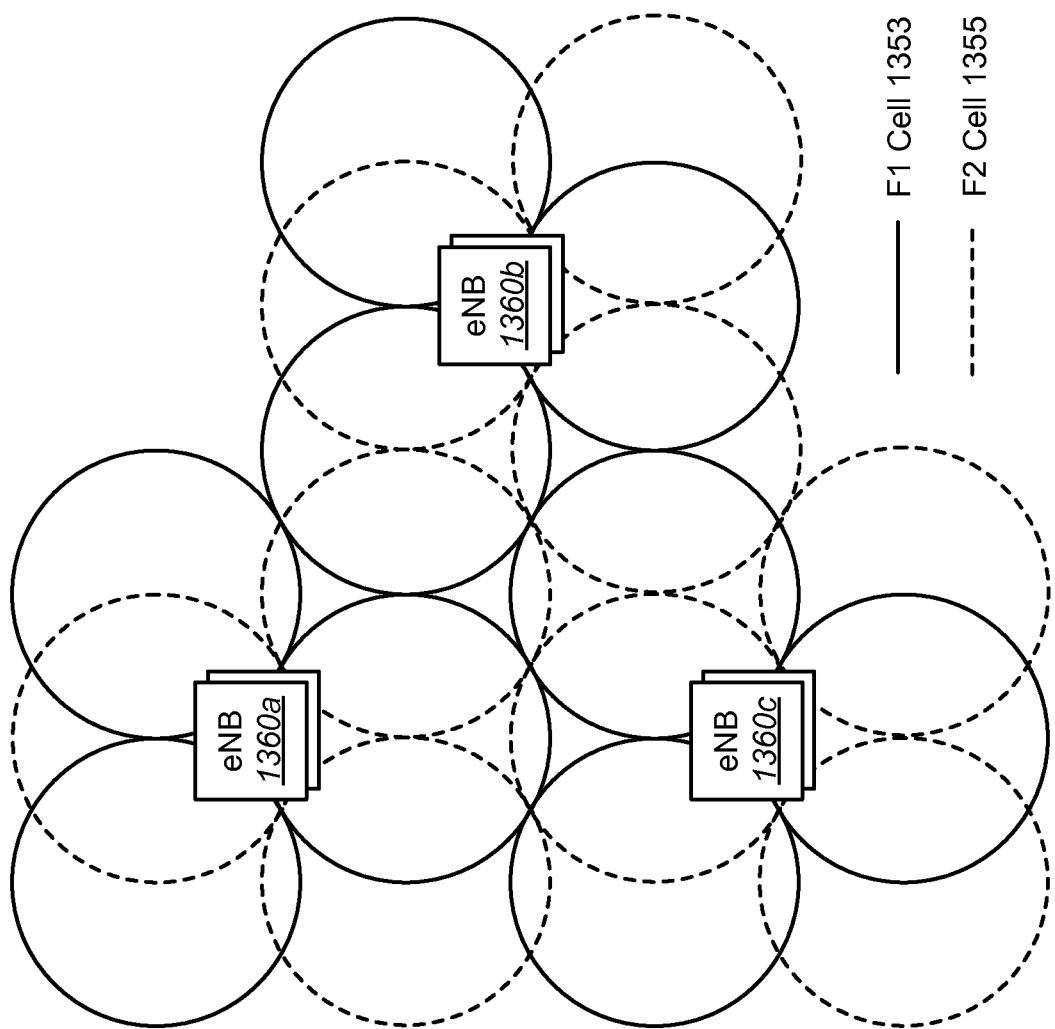
FIG. 13 is a block diagram illustrating a carrier aggregation configuration in which a first cell and a second cell are co-located, but the second cell antennas are directed to the cell boundaries of the first cell.

FIG. 13 is a block diagram illustrating a carrier aggregation configuration in which a first cell 1353 and second cell 1355 are co-located, but the second cell 1355 antennas are directed to the cell boundaries of the first cell 1353. The eNBs 1360*a-c* described in connection with FIG. 13 may be implemented in accordance with the eNB 160 described in connection with FIG. 1. The systems and methods disclosed herein may be used to establish radio interfaces between the F1 cells 1353 and F2 cells 1355.

In this configuration, the F1 cells 1353 and the F2 cells 1355 may be co-located, but the F2 cell 1355 antennas may be directed to the cell boundaries of the F1 cell 1353 so that cell edge throughput may be increased. The F1 cell 1353 may provide sufficient coverage, but the F2 cell 1353 may potentially have holes (e.g., due to larger path loss). Mobility may be based on F1 cell 1353 coverage. A likely scenario for this configuration may be when the F1 cell 1353 and the F2 cell 1355 are of different bands. For example, the F1 cell 1353 may equal 800 MHz or 2 GHz and the F2 cell 1355 may equal 3.5 GHz, etc. It is expected that the F1 cell 1353 and the F2 cell 1355 of the same eNB 1360 may be aggregated where coverage overlaps.

Figure 14:
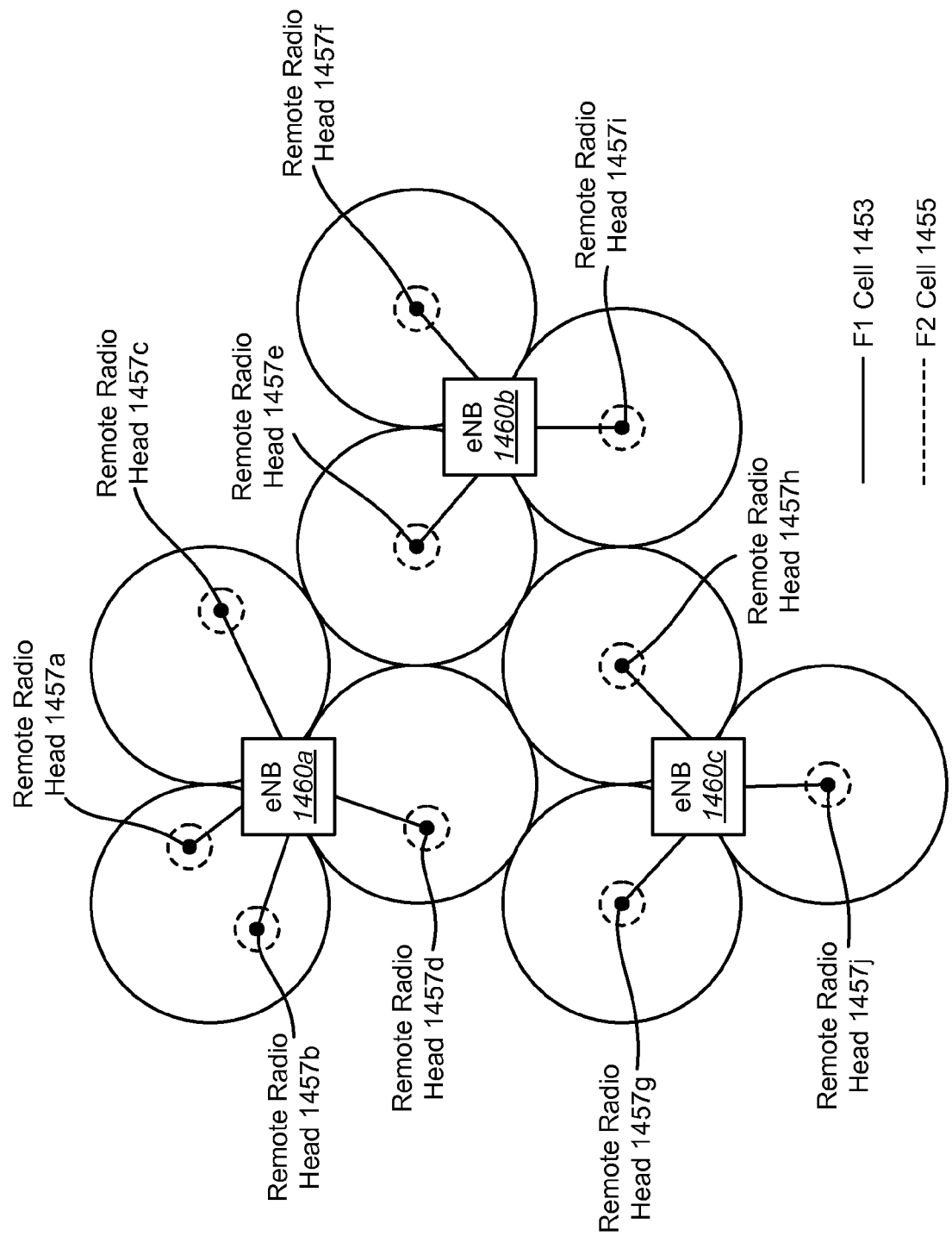
FIG. 14 is a block diagram illustrating a carrier aggregation configuration in which a first cell provides macro coverage and in which remote radio heads (RRH) on a second cell are used to improve throughput at hotspots.

FIG. 14 is a block diagram illustrating a carrier aggregation configuration in which a first cell 1453 provides macro coverage and in which remote radio heads (RRH) 1457*a-j* on the second cell 1455 are used to improve throughput at hotspots. The eNBs 1460*a-c* described in connection with FIG. 14 may be implemented in accordance with the eNB 160 described in connection with FIG. 1. In this configuration, multiple eNBs 1460*a-c* may provide macro coverage for a first cell 1453. RRHs 1457*a-j* may be connected to the eNBs 1460*a-c* and may provide second cell 1455 coverage. The systems and methods disclosed herein may be used to establish radio interfaces between the F1 cells 1453 and F2 cells 1455.

In this configuration, the F1 cells 1453 may provide macro coverage and the remote radio heads (RRH) 1457*a-j* on F2 cells 1455 may be used to improve throughput at hotspots. Mobility may be performed based on F1 cell 1453 coverage. A likely scenario for this configuration may be when F1 cells 1453 and F2 cells 1455 are of different bands. For example, the F1 cell 1453 may equal 900 MHz or 2 GHz and the F2 cell 1455 may equal 3.5 GHz, etc. It is expected that the F2 RRH cells 1455 may be aggregated with the underlying F1 cell 1453 (e.g., the macro cells).

Figure 15:
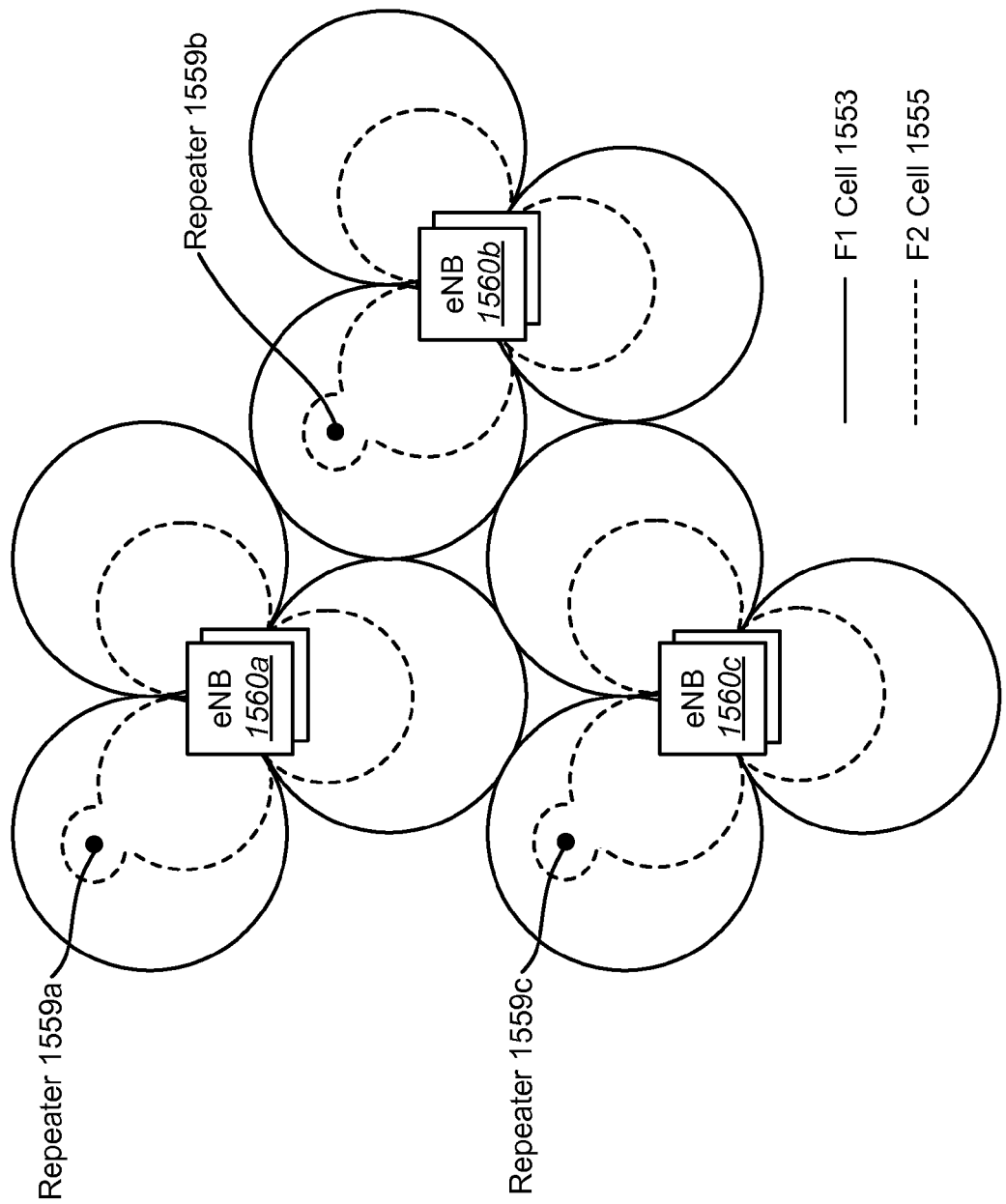
FIG. 15 is a block diagram illustrating a carrier aggregation configuration in which frequency selective repeaters are deployed.

FIG. 15 is a block diagram illustrating a carrier aggregation configuration in which frequency selective repeaters 1559*a-c* are deployed. This configuration may be similar to the configuration described in connection with FIG. 10. The systems and methods disclosed herein may be used to establish radio interfaces between the F1 cells 1553 and the F2 cells 1555. In this configuration, frequency selective repeaters 1559*a-c* may be deployed so that coverage may be extended for one of the carrier frequencies. The eNBs 1560*a-c* described in connection with FIG. 15 may be implemented in accordance with the eNB 160 described in connection with FIG. 1. Multiple eNBs 1560*a-c* may be associated with the F1 cells 1553. It is expected that an F1 cell 1553 and an F2 cell 1555 may be aggregated where coverage overlaps.

Figure 16:
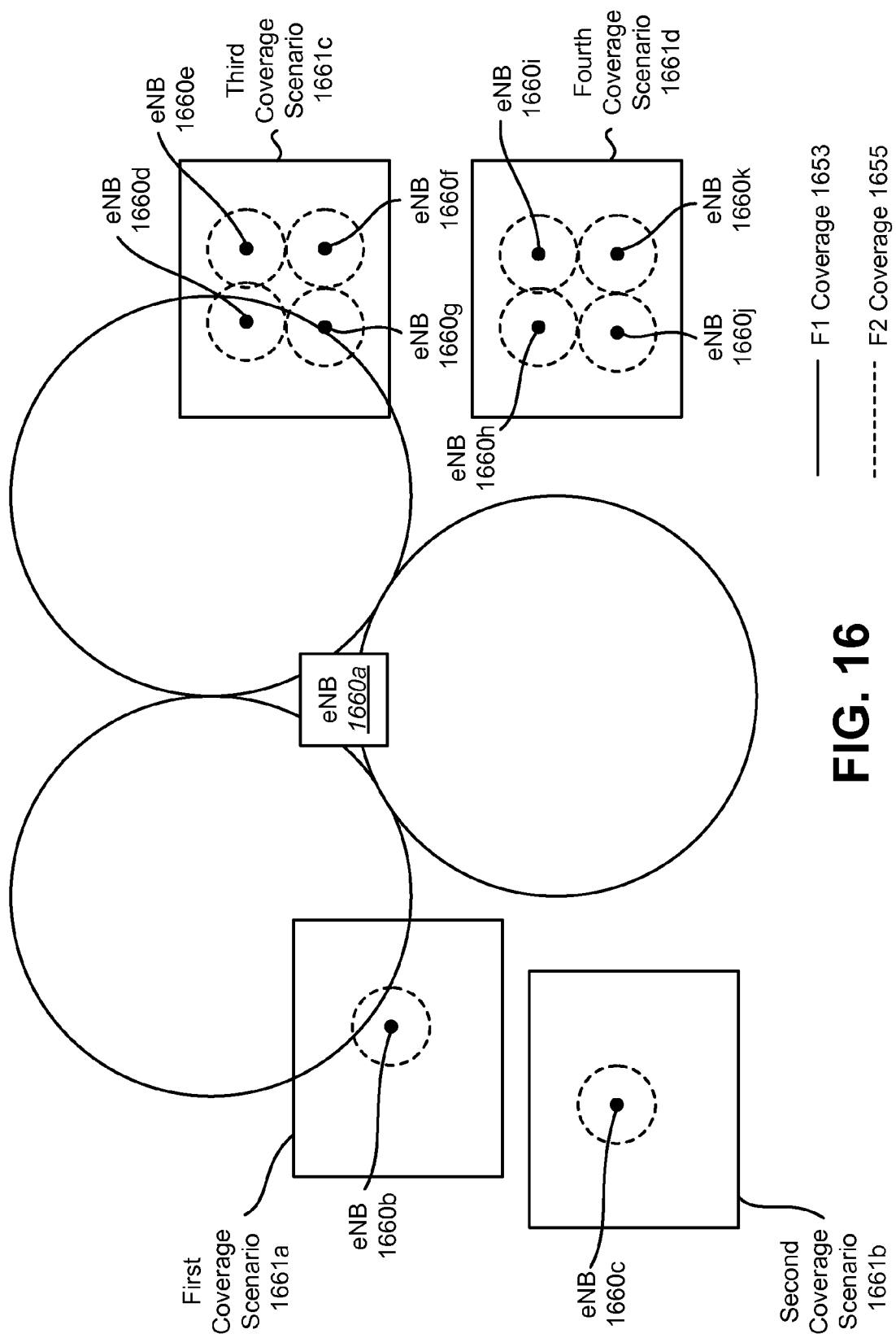
FIG. 16 is a block diagram illustrating multiple coverage scenarios for small cells with and without macro coverage.

FIG. 16 is a block diagram illustrating multiple coverage scenarios 1661*a-d* for small cells with and without macro coverage. The eNBs 1660*a-k* described in connection with FIG. 16 may be implemented in accordance with the eNB 160 described in connection with FIG. 1. The coverage scenarios 1661*a-d* may include indoor and outdoor scenarios using low-power nodes (e.g., eNBs 1660*b-k*). These low-power nodes may provide small cell coverage (e.g., F2 coverage 1655). An eNB 1660*a* may provide macro cell coverage (e.g., F1 coverage 1653).

Small cell enhancements may target both scenarios in which macro coverage may or may not be present. The systems and methods described herein may provide for establishing multiple connections in small cell deployment scenarios. These scenarios may include both outdoor and indoor small cell deployments and both ideal and non-ideal backhaul. Additionally, multiple connections may be established in both sparse and dense small cell deployments.

The E-UTRAN architecture may be able to achieve the system and mobility performance for small cell enhancement. For example, before the type of interface (connection) is determined, the E-UTRAN architecture may identify which kind of information may be needed (or may be beneficial) to be exchanged between nodes in order to get the desired improvements. In some implementations, the systems and methods described herein may identify potential technologies in the protocol and architecture that may provide enhanced support of small cell deployment and operation. In some configurations, these potential technologies may be implemented in accordance with scenarios and requirements as described in TR 36.932.

For example, the systems and methods described herein may identify and evaluate the benefits of UEs 102 having multi-connectivity to macro and small cell layers that may be served by different (or the same) carrier(s). The systems and methods described herein may also identify and evaluate scenarios where multi-connectivity may be feasible and beneficial.

The systems and methods described herein may identify and evaluate potential architectures and protocol enhancements for different scenarios (such as those described in TR 36.392). The different scenarios may include a scenario that implements multi-connectivity and that minimizes core network impacts. For example, the systems and methods described herein may provide the overall structure of a control plane and a user plane and their relation to each other. For example, the control plane and the user plane may be supported in different nodes, termination of different protocol layers, etc.

In a small cell deployment scenario, each node (e.g., eNB 1660*a-k*) may have its own independent scheduler. To utilize radio resources efficiently, a UE 102 may connect to multiple nodes that have different schedulers. To connect to multiple nodes that have different schedulers, multiple connections between the UE 102 and E-UTRAN 435 may be established.

The first coverage scenario 1661*a* illustrates a single small cell (e.g., the F2) with macro coverage (e.g., the F1). In FIG. 16, F1 may be the carrier frequency for the macro layer, and F2 may be the carrier frequency of the local-node layer. In the first coverage scenario 1661*a*, the macro cell may overlap the small cell.

The second coverage scenario 1661*b* illustrates a single small cell without macro coverage. The third coverage scenario 1661*c* illustrates multiple small cells with overlapping macro cell coverage. The fourth coverage scenario 1661*d* illustrates multiple small cells without macro cell coverage.

Figure 17:
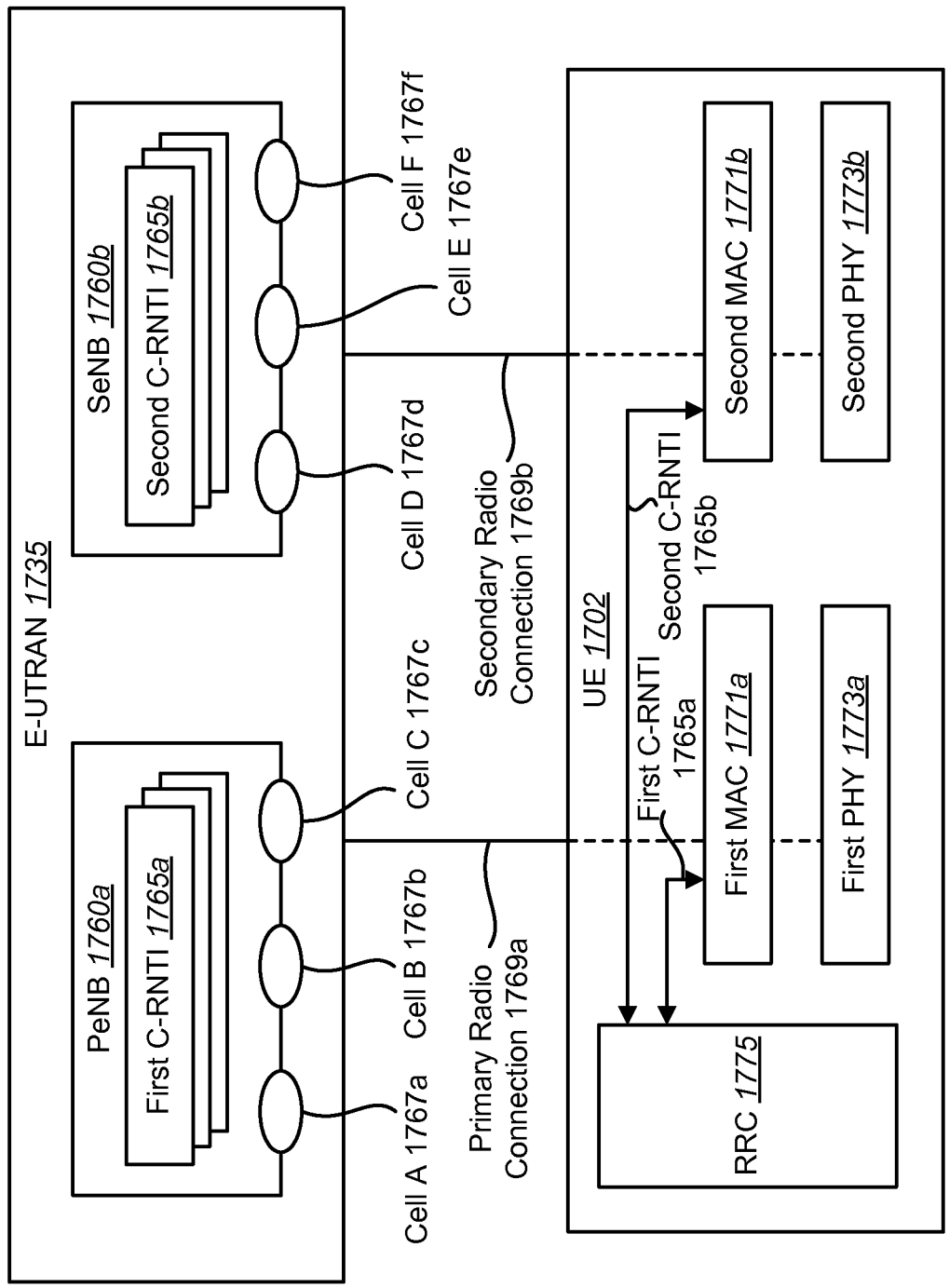
FIG. 17 is a block diagram illustrating one configuration of an E-UTRAN and a UE in which systems and methods for establishing multiple radio connections may be implemented.

FIG. 17 is a block diagram illustrating one configuration of an E-UTRAN 1735 and a UE 1702 in which systems and methods for establishing multiple radio connections may be implemented. The UE 1702 and the E-UTRAN 1735 described in connection with FIG. 17 may be implemented in accordance with corresponding elements described in connection with at least one of FIGS. 1 and 6.

FIG. 17 depicts one C-RNTI 1765*a-b* per radio connection 1769*a-b*. Using one C-RNTI 1765*a-b* per radio connection 1769*a-b* may maintain flexibility in radio resource management. For example, a first C-RNTI 1765*a* may be allocated to the primary radio connection 1769*a*. A second C-RNTI 1765*b* may be allocated to the secondary radio connection 1769*b*. In some implementations, the first C-RNTI 1765*a* may be allocated in accordance with Rel-11. For example, the first C-RNTI 1765*a* may be assigned after a random access. In some cases, a random access may include initial access when the UE 1702 is in an RRC_IDLE state or when the UE 1702 has completed a RRC connection re-establishment procedure. In another example, the first C-RNTI 1765*a* may be updated during a handover procedure.

The second C-RNTI 1765*b* (for the secondary radio connection 1769*b*) may be allocated by control signaling (e.g., RRC dedicated signaling) from the E-UTRAN 1735 (e.g., the PeNB 1760*a* or the SeNB 1760*b*) to the UE 1702. The usage of the first C-RNTI 1765*a* and the second C-RNTI 1765*b* may be in accordance with the usages described in connection with Table (2).

In some implementations, a C-RNTI 1765 may be unique for a cell. For example, for a certain cell, a value for a first C-RNTI 1765*a* (or a second C-RNTI 1765*b*) may be used for the UE 1702. In this example, the value should not be used for another C-RNTI 1765 in the cell. The E-UTRAN 1735 may manage the allocation of a first C-RNTI 1765*a* and/or a second C-RNTI 1765*b* for each UE 1702 such that the C-RNTI values do not conflict with each other. Also, it should be noted that if the UE 1702 is configured with multiple serving cells in a radio connection 1769, the same C-RNTI 1765 may be allocated to the serving cells for each radio connection 1769.

In some implementations, the E-UTRAN 1735 may include a PeNB 1760*a* and a SeNB 1760*b*. The UE 1702 may communicate with the PeNB 1760*a* via the primary radio connection 1769*a*. The UE 1702 may communicate with the SeNB 1760*b* via the secondary radio connection 1769*b*. While FIG. 17 depicts one primary radio connection 1769*a* and one secondary radio connection 1769*b*, the UE 1702 may be configured with one primary radio connection 1769*a* and one or more secondary radio connections 1769*b*. The PeNB 1760*a* and SeNB 1760*b* may be implemented in accordance with the eNB 160 described in connection with FIG. 1.

The PeNB 1760*a* may provide multiple cells 1767*a-c* for connection to one or more UEs 1702. For example, the PeNB 1760*a* may provide cell A 1767*a*, cell B 1767*b* and cell C 1767*c*. Similarly, the SeNB 1760*b* may provide multiple cells 1767*d-f*. The UE 1702 may be configured to transmit/receive on one or more cells (e.g., cell A 1767*a*, cell B 1767*b* and cell C 1767*c*) for the primary radio connection 1769*a* (e.g., a primary Uu interface). The UE 1702 may also be configured to transmit/receive on one or more other cells (e.g., cell D 1767*d*, cell E 1767*e* and cell F 1767*f*) for the secondary radio connection 1769*b* (e.g., a secondary Uu interface). If the UE 1702 is configured to transmit/receive on multiple cells 1767*a-f* for a radio connection 1769*a-b*, a carrier aggregation operation may be applied to the radio connection 1769*a-b*. In some implementations, another UE 1702 may be configured with cell A 1767*a* for the secondary radio connection 1769*b* and cell D 1767*d* for a primary radio connection 1769*a*. In this implementation, mapping cells to a radio connection 1769 may be a UE 1702 specific configuration.

As described above, one MAC entity 1771*a-b* and one PHY entity 1773*a-b* may be mapped to one radio connection 1769*a-b*. For example, a first MAC entity 1771*a* and a first PHY entity 1773*a* may be mapped to the primary radio connection 1769*a*. Similarly, a second MAC entity 1771*b* and a second PHY entity 1773*b* may be mapped to the secondary radio connection 1769*b*.

In some implementations, the PeNB 1760*a* may manage and store at least one C-RNTI 1765 for each UE 1702 using the configured cells 1767*a-c*. For example, the PeNB 1760*a* may manage and store multiple first C-RNTIs 1765*a* corresponding to UEs 1702 that have a primary radio connection 1769*a* with the PeNB 1760*a*. In a similar fashion, the SeNB 1760*b* may manage and store at least one C-RNTI 1765*b* for the secondary radio connection(s) 1769*b* for each UE 1702 using the configured cells 1767*d-f*. For example, the SeNB 1760*b* may manage and store multiple second C-RNTIs 1765*b* corresponding to UEs 1702 that have a secondary radio connection 1769*b* with the SeNB 1760*b*.

In some implementations, the PeNB 1760*a* may also store and manage multiple second C-RNTIs 1765*b* corresponding to UEs 1702 that have a secondary radio connection with the PeNB 1760*a*. For UEs that have a secondary radio connection with the eNB 1760*a*, the eNB 1760*a* should (instead) be considered a SeNB. In this implementation, an eNB may behave as both the PeNB 1760*a* and the SeNB 1760*b*.

In some implementations, the MAC entities 1771*a-b* may have an interface with an RRC entity 1775. In this implementation, the RRC entity 1775 may provide the first C-RNTI 1765*a* to the first MAC entity 1771*a* and the second C-RNTI 1765*b* to the second MAC entity 1771*b*. The RRC entity 1775 may receive RRC messages (e.g., RRC connection reconfiguration message, connection control message, handover command, etc.) from a RRC entity (not shown) of the E-UTRAN 1735. The RRC entity 1775 may also transmit RRC messages (e.g. RRC connection reconfiguration complete message) to the RRC entity (not shown) of the E-UTRAN 1735. The RRC entity 1775 may also store the first C-RNTI 1765*a* and the second C-RNTI 1765*b*. The MAC entities 1771*a-b* may control the decoding of the PDCCH (or the EPDCCH) based on the C-RNTIs 1765.

Figure 18:
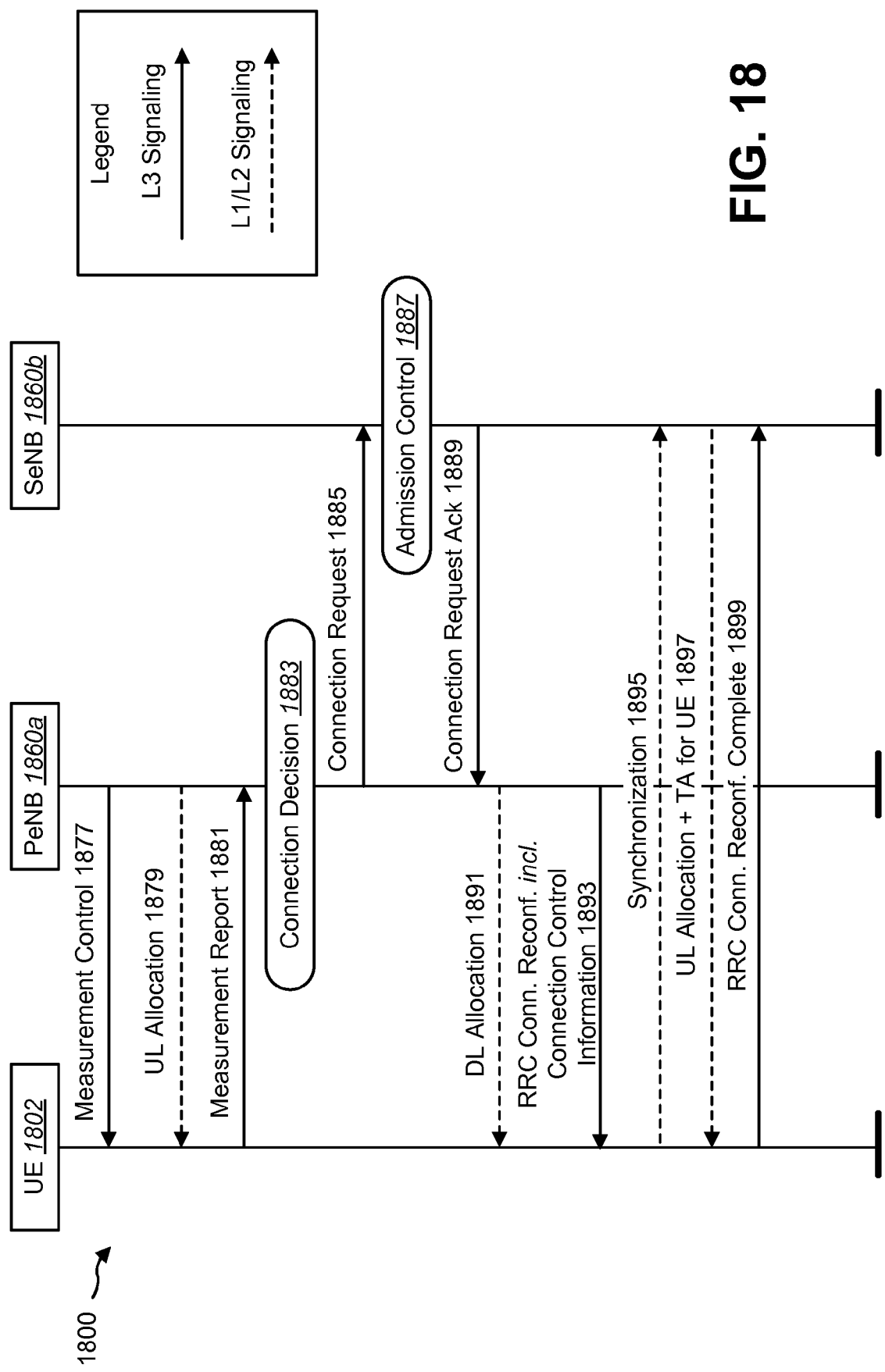
FIG. 18 is a thread diagram illustrating one configuration of eNBs and a UE in which systems and methods for establishing multiple radio connections may be implemented.

FIG. 18 is a thread diagram 1800 illustrating one configuration of eNBs 1860*a-b* and a UE 1802 in which systems and methods for establishing multiple radio connections may be implemented. Specifically, FIG. 18 illustrates one example of procedures for adding a radio connection. The eNBs 1860*a-b* and the UE 1802 described in connection with FIG. 18 may be implemented in accordance with one or more corresponding elements described in connection with FIG. 1.

The PeNB 1860*a* may configure UE 1802 measurement procedures via layer 3 (L3) signaling (e.g., an RRC message). The UE 1802 measurement procedures may be based on area restriction information. The measurements provided by the PeNB 1860*a* may assist in controlling the UE's 1802 connection mobility. The PeNB 1860*a* may then send 1877 a measurement control to the UE 1802. The PeNB 1860*a* may send 1879 an uplink allocation to the UE 1802 via layer 1 (L1)/ layer 2 (L2) signaling (e.g., PDCCH, a MAC control element).

The measurement control may trigger the UE 1802 to send 1881 a measurement report to the PeNB 1860*a*. The UE 1802 may be triggered to send 1881 the measurement report based on one or more rules (e.g., system information, a specification, etc.). Based on the measurement report and other information, the PeNB 1860*a* may decide 1883 to add another connection to the UE 1802. An example of other information may include radio resource management information.

The PeNB 1860*a* may then issue 1885 a connection request message to the SeNB 1860*b*. The connection request message may be based on the measurement report and radio resource management information. The connection request message may include necessary information that allows the SeNB 1860*b* to prepare the addition of connection. For example, the connection request message may include RRC context including the C-RNTI of the UE 1802 in the PeNB, QoS information, etc. One or more of UE X2 and UE S1 signaling references may enable the SeNB 1860*b* to address the PeNB 1860*a* and the evolved packet core (EPC).

The SeNB 1860*b* may perform 1887 admission control. In some implementations, the admission control may be based on the received QoS information. The admission control may evaluate whether a required QoS may be achieved if the resources can be granted by the SeNB 1860*b*, in order to increase the likelihood of a successful connection control. In some implementations, the SeNB 1860*b* may configure resources according to the received QoS information. The SeNB 1860 may also reserve one or more of a C-RNTI, a cell and optionally, a RACH preamble identity.

The SeNB 1860*b* may prepare the addition of connection with one or more of L1 (PHY) and L2 (MAC) entities of the SeNB 1660*b* and may send 1889 a connection request acknowledge (Ack) to the PeNB 1860*a*. The connection request Ack may include a transparent container to be sent to the UE 1802 (from the PeNB 1860*a*, for example) as a connection control message (in an RRC connection reconfiguration message, for example) that directs the UE 1802 to perform an addition of connection. The container may include a new C-RNTI (e.g., a second C-RNTI), a physical cell identifier for a cell to be accessed (e.g., a target cell) in a secondary radio connection, SeNB 1860*b* security algorithm identifiers for the selected security algorithms and a dedicated RACH preamble identity. The connection control message may also include other parameters (e.g., a radio bearer configuration, access parameters, SIBs, etc.) Specifically, the connection control message may indicate whether a dedicated RACH preamble identity is included or not.

The PeNB 1860*a* may generate the RRC connection reconfiguration message that includes instructions to perform the addition of connection (e.g., the RRCConnectionReconfiguration message including connection control message) to be sent to the UE 1802. To schedule 1893 the connection control message (abbreviated as "RRC Conn. Reconf." in FIG. 18 for convenience), the PeNB 1860*a* may send 1891 a downlink allocation to the UE 1802 via L1/L2 signaling.

The UE 1802 may receive the RRC connection reconfiguration message including the connection control message (e.g., the RRCConnectionReconfiguration message with the necessary parameters (C-RNTI for the secondary radio connection, SeNB 1860*b* security algorithm identifiers, and optionally a dedicated RACH preamble identity, SeNB 1860*b* SIBs, etc.)). The PeNB 1860*a* may then command or direct the UE 1802 to perform the addition of connection.

After receiving the connection control message (e.g., the connection control message included in the RRCConnectionReconfiguration message), the UE 1802 may synchronize 1895 (e.g., acquire synchronization signals) with the SeNB 1860*b* and may access (e.g., perform a random access procedure) the target cell via the RACH. The UE 1802 may access the target cell following a contention-free random access procedure (e.g., non-contention-based random access procedure) if a dedicated RACH preamble was indicated in the connection control information (a dedicated RACH preamble identity was included in the connection control message, for example). By comparison, the UE 1802 may access the target cell following a contention-based random access procedure if no dedicated preamble was indicated. In some implementations, the UE 1802 may derive SeNB 1860*b* specific keys and may configure the selected security algorithms to be used in the target cell.

In some implementations, the SeNB 1860*b* may respond to the random access by sending 1897 an uplink allocation and a timing advance to the UE 1802. Then, when the UE 1802 has successfully accessed the target cell, the UE 1802 may send 1899 a RRC connection reconfiguration complete message (e.g., the RRCConnectionReconfigurationComplete message), which may include the second C-RNTI, to confirm the addition of the connection. The UE 1802 may also send an uplink buffer status report to the SeNB 1860*b* to indicate that the connection addition procedure has been completed for the UE 1802. The SeNB 1860*b* may verify the second C-RNTI sent in the RRC connection reconfiguration complete message (e.g., the RRCConnectionReconfigurationComplete message). The SeNB 1860*b* may then begin sending data to the UE 1802.

It should be noted that different levels of signaling may be used for different steps of the method. For example, one or more of sending 1877 a measurement control, sending 1881 a measurement report, sending 1885 a connection request, sending 1889 a connection request acknowledge, sending 1893 a connection control message, and sending 1899 a RRC connection reconfiguration complete message may be performed using L3 signaling. By comparison, one or more of sending 1879 an uplink allocation, sending 1891 a downlink allocation, synchronizing 1895 and sending 1897 an uplink allocation and timing advance may be performed using one or more of L1 and L2 signaling.

Figure 19:
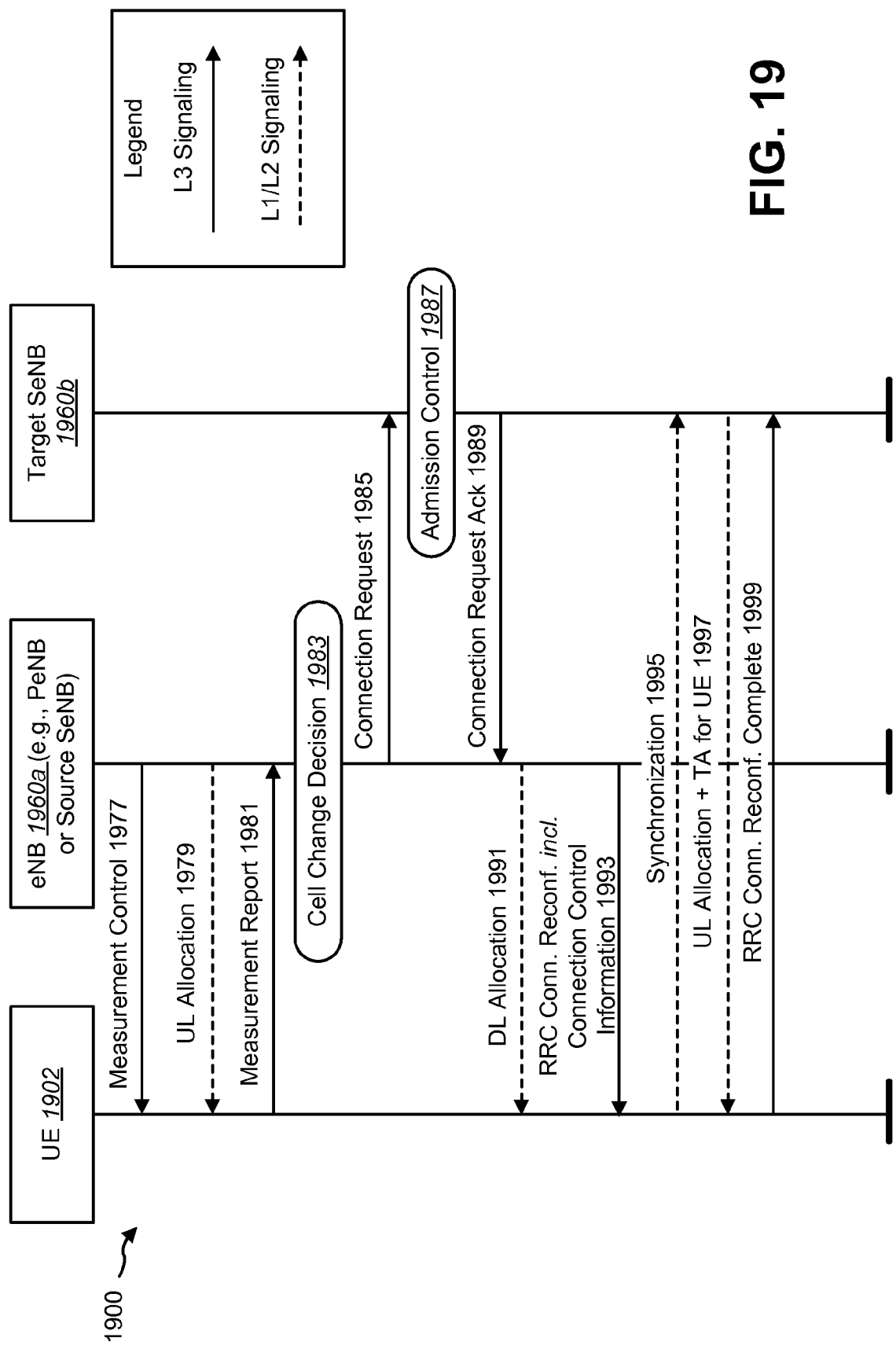
FIG. 19 is a thread diagram illustrating another configuration of eNBS and a UE in which systems and methods for establishing multiple radio connections may be implemented.

FIG. 19 is a thread diagram 1900 illustrating one configuration of eNBs 1960*a-b* and a UE 1902 in which systems and methods for establishing multiple radio connections may be implemented. Specifically, FIG. 19 illustrates an example of procedures for changing a cell in a radio connection (e.g., handover in the secondary radio connection). In this example, information exchange between the PeNB and a source SeNB is omitted. The eNBs 1960*a-b* and the UE 1902 described in connection with FIG. 19 may be implemented in accordance with one or more corresponding elements described in connection with FIG. 1.

The eNB 1960*a* (e.g., a PeNB or a source SeNB) may configure UE 1902 measurement procedures. The UE 1902 measurement procedures may be based on area restriction information. The measurements provided by the eNB 1960*a* may assist in controlling the UE's 1902 connection mobility. The eNB 1960*a* may then send 1977 a measurement control to the UE 1902. The eNB 1960*a* may send 1979 an uplink allocation to the UE 1902 via L1/L2 signaling (e.g., PDCCH, a MAC control element).

The measurement control may trigger the UE 1902 to send 1981 a measurement report to the eNB 1960*a*. The UE 1902 may be triggered to send 1981 the measurement report based on one or more rules (e.g., system information, a specification, etc.). Based on the measurement report and other information, the eNB 1960*a* may decide 1983 to change a cell to the UE 1902. An example of other information may include radio resource management information.

The eNB 1960*a* may then issue 1985 a connection request message to the target SeNB 1660*b*. The connection request message may be based on the measurement report and radio resource management information. The connection request message may include necessary information that allows the target SeNB 1960*b* to prepare the handover in the secondary connection. For example, the connection request message may include RRC context including the C-RNTI of the UE 1902 in the source eNB, QoS information, etc. One or more of the UE X2 and UE S1 signaling references may enable the target SeNB 1960*b* to address the eNB 1960*a* and the EPC.

The target SeNB 1960*b* may perform 1987 admission control. In some implementations, the admission control may be based on the received QoS information. The admission control may evaluate whether the required QoS may be achieved if the resources can be granted by the target SeNB 1760*b*, in order to increase the likelihood of a successful connection control. In some implementations, the target SeNB 1960*b* may configure resources according to the received QoS information. The target SeNB 1960*b* may also reserve at least one of a C-RNTI, a cell and optionally, a RACH preamble identity.

The target SeNB 1960*b* may prepare the handover in the secondary connection with one or more of L1 (PHY) and L2 (MAC) entities of the eNB 1760*a* and may send 1989 a connection request Ack to the eNB 1960*a*. The connection request Ack may include a transparent container to be sent to the UE 1902 (from the eNB 1960*a*, for example) as a connection control message (in an RRC connection reconfiguration message, for example) that directs the UE 1902 to perform the handover in the secondary connection. The container may include a new C-RNTI (e.g., a second C-RNTI), a physical cell identifier for a cell to be accessed (e.g., a target cell) in a secondary radio connection, target SeNB 1960*b* security algorithm identifiers for the selected security algorithms and a dedicated RACH preamble identity. The connection control message may also include other parameters (e.g., access parameters, system information blocks (SIBs), etc.) Specifically, the connection control message may indicate whether a dedicated RACH preamble identity has been included or not.

The eNB 1960*a* may generate the RRC connection reconfiguration message to perform the handover (e.g., the RRC-ConnectionReconfiguration message including connection control information) to be sent to the UE 1902. To schedule 1993 the connection control message (abbreviated as "RRC Conn. Reconf." in FIG. 19 for convenience), the eNB 1960*a* may send 1991 a downlink allocation to the UE 1902.

The UE 1902 may receive the RRC connection reconfiguration message including the connection control message (e.g., the RRCConnectionReconfiguration message with necessary parameters (C-RNTI for the secondary radio connection, target SeNB 1960*b* security algorithm identifiers, and optionally dedicated RACH preamble identity, target SeNB 1960*b* SIBs, etc.)). The eNB 1960*a* may then command or direct the UE 1902 to perform the handover in the secondary connection.

After receiving the connection control message (e.g., the connection control message included in the RRCConnectionReconfiguration message), the UE 1902 may synchronize 1995 (e.g., acquire synchronization signals) with the target SeNB 1960*b* and may access (e.g., perform a random access procedure) the target cell via the RACH. The UE 1902 may access the target cell following a contention-free random access procedure (e.g., non-contention-based random access procedure) if a dedicated RACH preamble was indicated in the connection control information (a dedicated RACH preamble identity was included in the connection control message, for example). By comparison, the UE 1902 may access the target cell following a contention-based random access procedure if no dedicated preamble was indicated. In some implementations, the UE 1902 may derive target SeNB 1960*b* specific keys and may configure the selected security algorithms to be used in the target cell.

In some implementations, the target SeNB 1960*b* may respond to the random access by sending 1997 an uplink allocation and a timing advance to the UE 1902. Then, when the UE 1902 has successfully accessed the target cell, the UE 1902 may send 1999 a RRC connection reconfiguration complete message (e.g., the RRCConnectionReconfigurationComplete message), which may include the second C-RNTI, to confirm the addition of the connection. The UE 1902 may also send an uplink buffer status report to the target SeNB 1960*b* to indicate that the connection addition procedure has been completed for the UE 1902. The target SeNB 1960*b* may verify the second C-RNTI sent in the RRC connection reconfiguration complete message (e.g., the RRCConnectionReconfigurationComplete message). The target SeNB 1960*b* may then begin sending data to the UE 1902.

It should be noted that different levels of signaling may be used for different steps of the method. For example, one or more of sending 1977 a measurement control, sending 1981 a measurement report, sending 1985 a connection request, sending 1989 a connection request acknowledge message, sending 1993 a connection control message, and sending 1999 a RRC connection reconfiguration complete message may be performed using L3 signaling. By comparison, one or more of sending 1979 an uplink allocation, sending 1991 a downlink allocation, synchronizing 1995 and sending 1997 an uplink allocation and timing advance may be performed using one or more of L1 and L2 signaling.

It should be noted that in FIGS. 18 and 19, similar connection control information may be used. This connection control information may have a similar structure as mobility control information used for handover for a single connection. This connection control information may also be used for intra-SeNB handover (e.g., cell change in a SeNB) and self-handover (e.g., handover to the same cell).

In FIG. 19, instead of a connection control message, a handover command (i.e., MobilityControlInfo) may be used. The handover command in the secondary radio connection may be included in a secondary RRC connection reconfiguration message which is distinguished from the RRC connection reconfiguration message used in the primary radio connection. After the secondary radio connection is added, the secondary RRC connection reconfiguration message is used to configure/reconfigure parameters of the secondary radio connection. Then, a secondary RRC connection reconfiguration complete message may be sent from the UE 102 to the target SeNB as an acknowledgement to the secondary RRC connection reconfiguration message. The secondary RRC connection reconfiguration complete message may be distinguished from the RRC connection reconfiguration complete message used in the primary radio connection.

Figure 20:
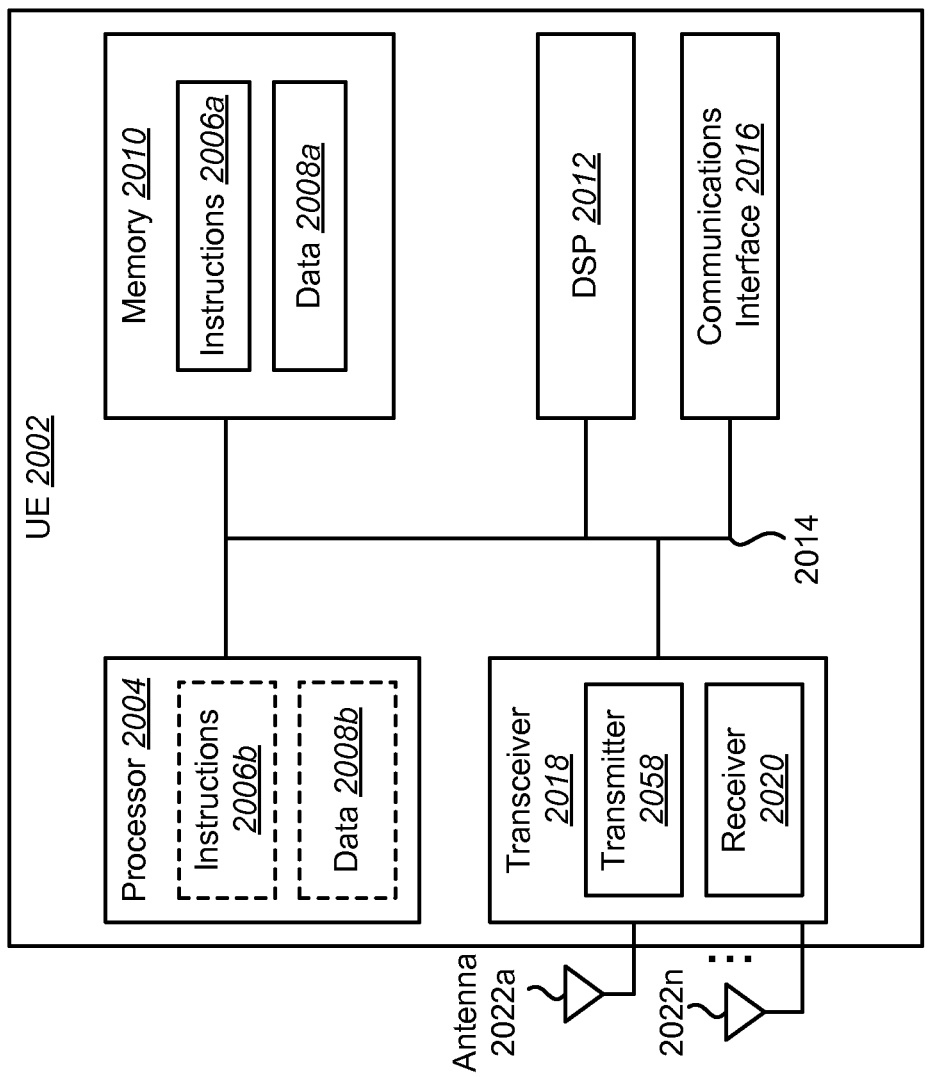
FIG. 20 illustrates various components that may be utilized in a UE.

FIG. 20 illustrates various components that may be utilized in a UE 2002. The UE 2002 described in connection with FIG. 20 may be implemented in accordance with the UE 102 described in connection with FIG. 1. The UE 2002 includes a processor 2004 that controls operation of the UE 2002. The processor 2004 may also be referred to as a central processing unit (CPU). Memory 2010, which may include read-only memory (ROM), random access memory (RAM), a combination of the two or any type of device that may store information, provides instructions 2006a and data 2008a to the processor 2004. A portion of the memory 2010 may also include non-volatile random access memory (NVRAM). Instructions 2006b and data 2008b may also reside in the processor 2004. Instructions 2006b and/or data 2008b loaded into the processor 2004 may also include instructions 2006a and/or data 2008a from memory 2010 that were loaded for execution or processing by the processor 2004. The instructions 2006b may be executed by the processor 2004 to implement one or more of the methods and procedures 200, 600, 1800 and 1900 described above.

The UE 2002 may also include a housing that contains one or more transmitters 2058 and one or more receivers 2020 to allow transmission and reception of data. The transmitter(s) 2058 and receiver(s) 2020 may be combined into one or more transceivers 2018. One or more antennas 2022a-n are attached to the housing and electrically coupled to the transceiver 2018.

The various components of the UE 2002 are coupled together by a bus system 2014, which may include a power bus, a control signal bus and a status signal bus, in addition to a data bus. However, for the sake of clarity, the various buses are illustrated in FIG. 20 as the bus system 2014. The UE 2002 may also include a digital signal processor (DSP) 2012 for use in processing signals. The UE 2002 may also include a communications interface 2016 that provides user access to the functions of the UE 2002. The UE 2002 illustrated in FIG. 20 is a functional block diagram rather than a listing of specific components.

Figure 21:
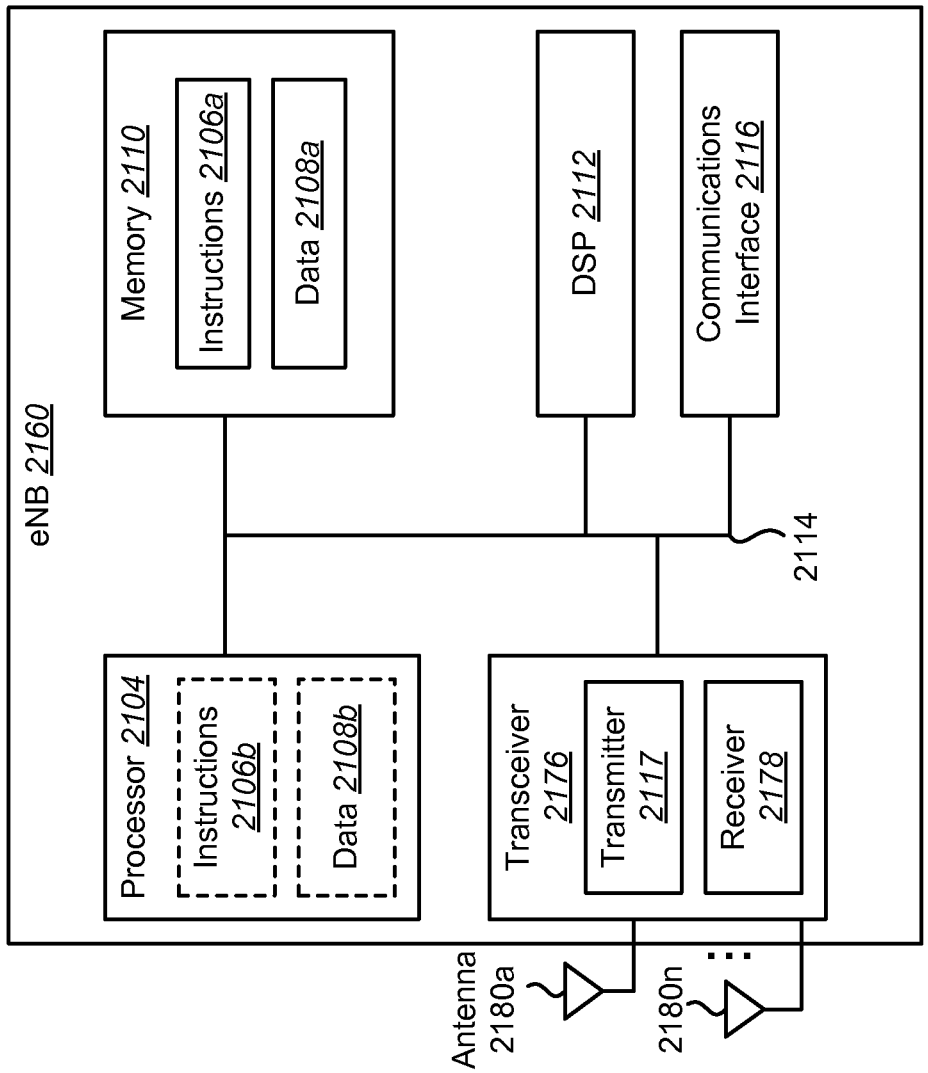
FIG. 21 illustrates various components that may be utilized in an eNB.

FIG. 21 illustrates various components that may be utilized in an eNB 2160. The eNB 2160 described in connection with FIG. 21 may be implemented in accordance with the eNB 160 described in connection with FIG. 1. The eNB 2160 includes a processor 2104 that controls operation of the eNB 2160. The processor 2104 may also be referred to as a central processing unit (CPU). Memory 2110, which may include read-only memory (ROM), random access memory (RAM), a combination of the two or any type of device that may store information, provides instructions 2106a and data 2108a to the processor 2104. A portion of the memory 2110 may also include non-volatile random access memory (NVRAM). Instructions 2106b and data 2108b may also reside in the processor 2104. Instructions 2106b and/or data 2108b loaded into the processor 2104 may also include instructions 2106a and/or data 2108a from memory 2110 that were loaded for execution or processing by the processor 2104. The instructions 2106b may be executed by the processor 2104 to implement one or more of the methods and procedures 300, 700, 1800 and 1900 described above.

The eNB 2160 may also include a housing that contains one or more transmitters 2117 and one or more receivers 2178 to allow transmission and reception of data. The transmitter(s) 2117 and receiver(s) 2178 may be combined into one or more transceivers 2176. One or more antennas 2180a-n are attached to the housing and electrically coupled to the transceiver 2176.

The various components of the eNB 2160 are coupled together by a bus system 2114, which may include a power bus, a control signal bus and a status signal bus, in addition to a data bus. However, for the sake of clarity, the various buses are illustrated in FIG. 21 as the bus system 2114. The eNB 2160 may also include a digital signal processor (DSP) 2112 for use in processing signals. The eNB 2160 may also include a communications interface 2116 that provides user access to the functions of the eNB 2160. The eNB 2160 illustrated in FIG. 21 is a functional block diagram rather than a listing of specific components.

Figure 22:
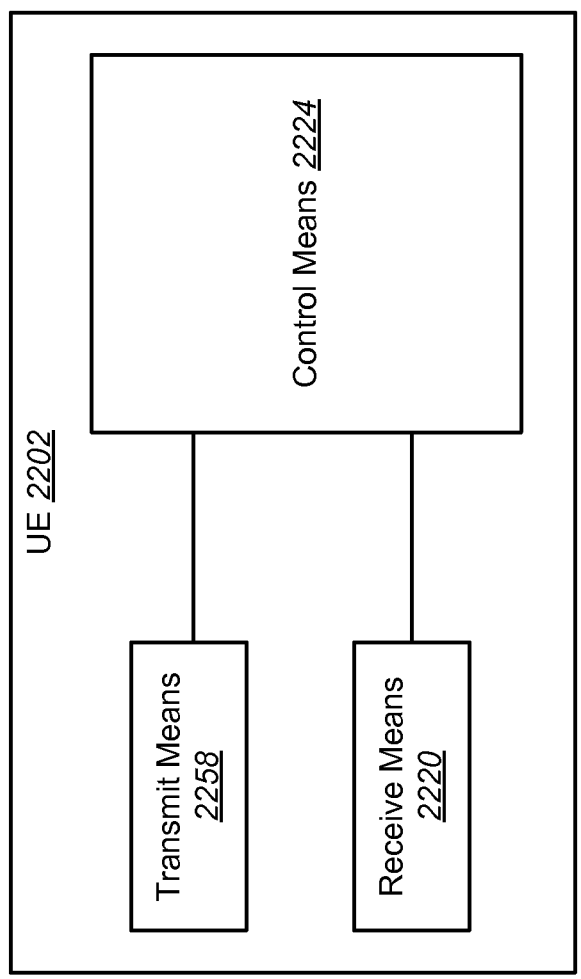
FIG. 22 is a block diagram illustrating one configuration of a UE in which systems and methods for establishing multiple radio connections may be implemented.

FIG. 22 is a block diagram illustrating one configuration of a UE 2202 in which systems and methods for establishing multiple radio connections may be implemented. The UE 2202 includes transmit means 2258, receive means 2220 and control means 2224. The transmit means 2258, receive means 2220 and control means 2224 may be configured to perform one or more of the functions described in connection with FIGS. 2, 6, 18 and 19 above. FIG. 20 above illustrates one example of a concrete apparatus structure of FIG. 22. Other various structures may be implemented to realize one or more of the functions of FIGS. 2, 6, 18 and 19. For example, a DSP may be realized by software.

Figure 23:
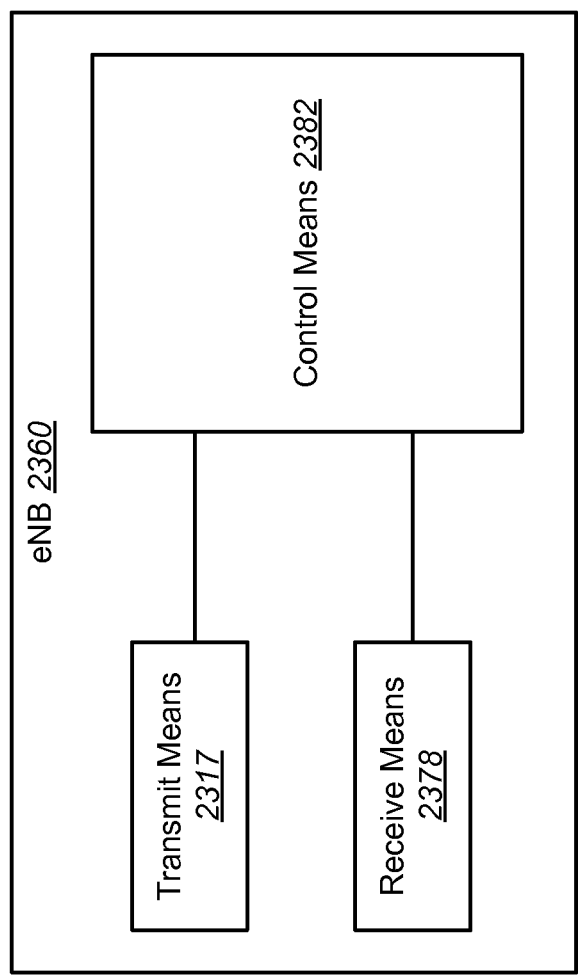
FIG. 23 is a block diagram illustrating one configuration of an eNB in which systems and methods for establishing multiple radio connections may be implemented.

FIG. 23 is a block diagram illustrating one configuration of an eNB 2360 in which systems and methods for establishing multiple radio connections may be implemented. The eNB 2360 includes transmit means 2317, receive means 2378 and control means 2382. The transmit means 2317, receive means 2378 and control means 2382 may be configured to perform one or more of the functions described in connection with FIGS. 3, 7, 18 and 19 above. FIG. 21 above illustrates one example of a concrete apparatus structure of FIG. 23. Other various structures may be implemented to realize one or more of the functions of FIGS. 3, 7, 18 and 19. For example, a DSP may be realized by software.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

What is claimed is:

1. A method performed by a user equipment (UE), comprising:
    receiving a connection control message for an establishment of a second set of one or more cells for dual connectivity, wherein a first set of cell(s) and the second set of cell(s) are configured for the dual connectivity, a first medium access control (MAC) entity corresponds to the first set of cell(s) and a second MAC entity corresponds to the second set of cell(s), the connection control message is included in a radio resource control (RRC) connection reconfiguration message and directs the UE to perform a random access procedure for a cell of the second set of one or more cells; and
    performing a random access procedure for a cell of the second set of one or more cells in response to receiving the RRC connection reconfiguration message.

2. The method of claim 1, wherein performing a random access procedure comprises:
    performing a non-contention-based random access procedure for the cell of the second set of one or more cells in a case that a random access preamble identity is indicated in the connection control message; and
    performing a contention-based random access procedure for the cell of the second set of one or more cells in a case that a random access preamble identity is not indicated.

3. A method performed by an evolved Node B (eNB), comprising:
    sending a connection control message for an establishment of a second set of one or more cells for dual connectivity, wherein a first set of cell(s) and the second set of cell(s) are configured for the dual connectivity, a first medium access control (MAC) entity corresponds to the first set of cell(s) and a second MAC entity corresponds to the second set of cell(s), the connection control message is included in a radio resource control (RRC) connection reconfiguration message and directs a user equipment (UE) to perform a random access procedure for a cell of the second set of one or more cells.

4. The method of claim 3, wherein the connection control message indicates whether a random access preamble identity is included in the connection control message.

5. A user equipment (UE), comprising:
    a processor;
    memory in electronic communication with the processor, wherein instructions stored in the memory are executable to:
        receive a connection control message for an establishment of a second set of one or more cells for dual connectivity, wherein a first set of cell(s) and the second set of cell(s) are configured for the dual connectivity, a first medium access control (MAC) entity corresponds to the first set of cell(s) and a second MAC entity corresponds to the second set of cell(s), the connection control message is included in a radio resource control (RRC) connection reconfiguration message and directs the UE to perform a random access procedure for a cell of the second set of one or more cells; and
        perform a random access procedure for a cell of the second set of one or more cells in response to receiving the RRC connection reconfiguration message.

6. The UE of claim 5, wherein the instructions executable to perform a random access procedure are further executable to:
    perform a non-contention-based random access procedure for the cell of the second set of one or more cells in a case that a random access preamble identity is indicated in the connection control message; and
    perform a contention-based random access procedure for the cell of the second set of one or more cells in a case that a random access preamble identity is not indicated.

7. An evolved Node B (eNB), comprising:
    a processor;
    memory in electronic communication with the processor, wherein instructions stored in the memory are executable to:
        send a connection control message for an establishment of a second set of one or more cells for dual connectivity, wherein a first set of cell(s) and the second set of cell(s) are configured for the dual connectivity, a first medium access control (MAC) entity corresponds to the first set of cell(s) and a second MAC entity corresponds to the second set of cell(s), the connection control message is included in a radio resource control (RRC) connection reconfiguration message and directs a user equipment (UE) to perform a random access procedure for a cell of the second set of one or more cells.

8. The eNB of claim 7, wherein the connection control message indicates whether a random access preamble identity is included in the connection control message.

* * * * *